US009591401B2

(12) United States Patent
 Inagaki

(10) Patent No.: US 9,591,401 B2
(45) Date of Patent: Mar. 7, 2017

(54) VIBRATION PICKUP DEVICE, VIBRATION MEASUREMENT DEVICE, MEASUREMENT SYSTEM, AND MEASUREMENT METHOD

(71) Applicant: KYOCERA CORPORATION, Kyoto (JP)

(72) Inventor: Tomohiro Inagaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 35 days.

(21) Appl. No.: 14/696,164

(22) Filed: Apr. 24, 2015

(65) Prior Publication Data
 US 2015/0256943 A1    Sep. 10, 2015

Related U.S. Application Data

(62) Division of application No. 14/438,554, filed as application No. PCT/JP2013/006245 on Oct. 22, 2013, now Pat. No. 9,462,374.

(30) Foreign Application Priority Data

Oct. 24, 2012   (JP) .................................. 2012-235030
Mar. 4, 2013    (JP) .................................. 2013-042335
Mar. 4, 2013    (JP) .................................. 2013-042339

(51) Int. Cl.
 *H04R 25/00*       (2006.01)
 *H04R 1/46*        (2006.01)
 (Continued)

(52) U.S. Cl.
 CPC .............. *H04R 1/46* (2013.01); *G01H 17/00* (2013.01); *H04M 1/24* (2013.01); *H04R 25/30* (2013.01);
 (Continued)

(58) Field of Classification Search
 CPC .......... H04R 1/46; H04R 25/30; H04R 29/00; H04R 29/001; H04R 2460/13; H04R 2499/11; H04M 1/24; G01H 17/00
 (Continued)

(56) References Cited

U.S. PATENT DOCUMENTS 4,251,686 A    2/1981   Sokolich
4,586,194 A    4/1986   Kohashi et al.
 (Continued)

FOREIGN PATENT DOCUMENTS

CN    101832813 A    9/2010
CN    101867863 A    10/2010
 (Continued)

OTHER PUBLICATIONS

International Search Report; PCT/JP2013/006245; Jan. 28, 2014.
 (Continued)

*Primary Examiner* — Brian Ensey
(74) *Attorney, Agent, or Firm* — Studebaker & Brackett PC

(57) ABSTRACT

A vibration pickup device for measuring an electronic device that transmits sound to a user via vibration transmission by pressing a vibrating body held in a housing against a human ear includes a plate-shaped vibration transmission member and a vibration pickup joined to a portion of the vibration transmission member. The vibration transmission member is mountable on a peripheral portion of an artificial external ear canal, formed in an ear model unit modeled after a human ear, and includes a hole in communication with the artificial external ear canal.

6 Claims, 22 Drawing Sheets

(51) Int. Cl.
*H04R 29/00* (2006.01)
*G01H 17/00* (2006.01)
*H04M 1/24* (2006.01)

(52) U.S. Cl.
CPC .......... *H04R 29/00* (2013.01); *H04R 29/001* (2013.01); *H04R 2460/13* (2013.01); *H04R 2499/11* (2013.01)

(58) Field of Classification Search
USPC .................................................. 381/23.1, 60
See application file for complete search history.

(56) References Cited

U.S. PATENT DOCUMENTS

| | | | |
|---|---|---|---|
| 4,852,150 A * | 7/1989 | Yamamoto .............. | H04M 1/65 379/70 |
| 5,624,377 A | 4/1997 | Davis | |
| 5,794,188 A | 8/1998 | Hollier | |
| 8,577,050 B2 * | 11/2013 | Margolis .............. | H04R 29/001 381/60 |
| 2008/0056518 A1 * | 3/2008 | Burrows ................ | H04R 25/70 381/314 |
| 2010/0074451 A1 | 3/2010 | Usher et al. | |
| 2010/0092001 A1 | 4/2010 | Saltykov et al. | |

FOREIGN PATENT DOCUMENTS

| | | |
|---|---|---|
| DE | 19618019 A1 | 11/1997 |
| EP | 0637188 A1 | 2/1995 |
| JP | 02-080925 A | 3/1990 |
| JP | H03-168000 A | 7/1991 |
| JP | 11-500284 A | 1/1999 |
| JP | 2000-151785 A | 5/2000 |
| JP | 2003-222553 A | 8/2003 |
| JP | 2005-348193 A | 12/2005 |
| JP | 2007-174176 A | 7/2007 |
| JP | 2007-306275 A | 11/2007 |
| JP | 2012-002759 A | 1/2012 |

OTHER PUBLICATIONS

Written Opinion of the International Searching Authority; PCT/JP2013/006245; Jan. 28, 2014.

The extended European search report issued by the European Patent Office on Mar. 24, 2016, which corresponds to European Patent Application No. 15180111.5-1559 and is related to U.S. Appl. No. 14/438,554.

Klaus A. Riederer et al.; "Sophisticated tube headphones for spatial sound reproduction"; Audio Engineering Society Conference Paper; Jun. 1-3, 2002; pp. 1-9; St. Petersburg, Russia.

James M. Kates; "A test suite for hearing aid evaluation"; Journal of Rehabilitation Research and Development; 1990; pp. 255-278; vol. 27; No. 3; Department of Veterans Affairs; US.

The extended European search report issued by the European Patent Office on Dec. 22, 2015, which corresponds to European Patent Application No. 15180108.1-1559 and is related to U.S. Appl. No. 14/696,164.

The extended European search report issued by the European Patent Office on Jun. 29, 2016, which corresponds to European Patent Application No. 13849013.1-1559 and is related to U.S. Appl. No. 14/696,164.

* cited by examiner

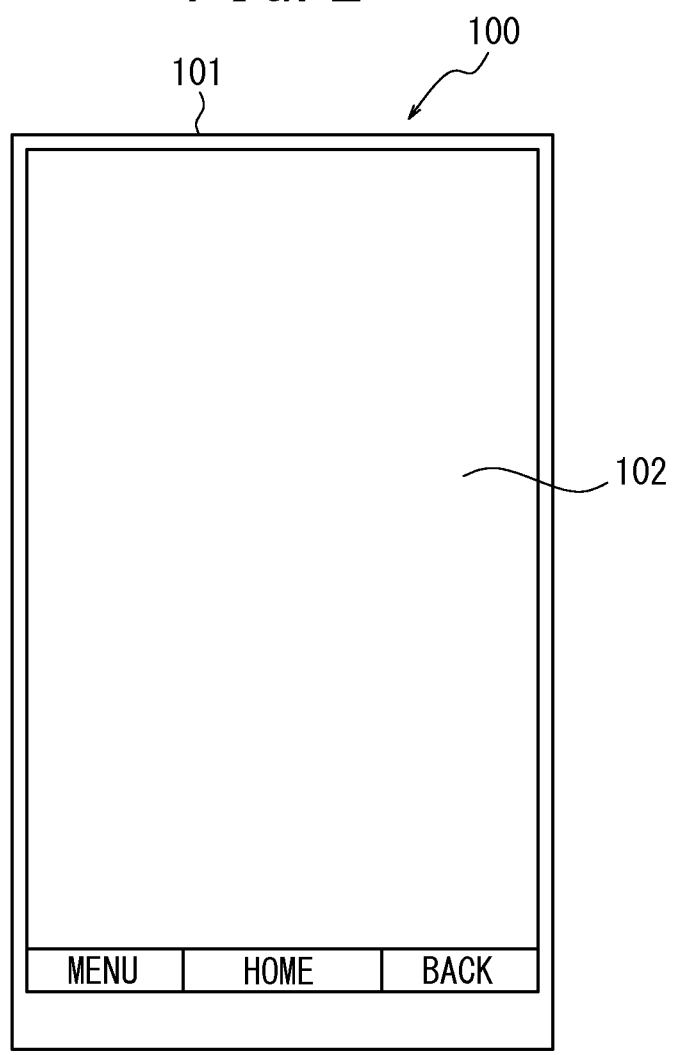

ID DEVICE, VIBRATION
VIBRATION PICKUP DEVICE, VIBRATION MEASUREMENT DEVICE, MEASUREMENT SYSTEM, AND MEASUREMENT METHOD

CROSS-REFERENCE TO RELATED APPLICATIONS

This application claims priority to and the benefit of Japanese Patent Application No. 2012-235030 filed Oct. 24, 2012, and Japanese Patent Application No. 2013-042335 and Japanese Patent Application No. 2013-042339 filed Mar. 4, 2013, the entire contents of which are incorporated herein by reference.

TECHNICAL FIELD

The present invention is related to a vibration pickup device and a vibration measurement device for measuring an amount of vibration by an electronic device that is configured to transmit sound to a user via vibration transmission by pressing a vibrating body held in a housing against a human ear. The present invention also relates to a measurement system and a measurement method for measuring vibration of the electronic device and to a measurement system and measurement method for evaluating the electronic device.

BACKGROUND

JP 2005-348193 A (PTL 1) discloses an electronic device, such as a mobile phone or the like, that transmits air-conducted sound and bone-conducted sound to a user. As the air-conducted sound, PTL 1 discloses a sound that is transmitted to the user's auditory nerve by air vibrations, caused by a vibrating object, that are transmitted through the external ear canal to the eardrum and cause the eardrum to vibrate. As the bone-conducted sound, PTL 1 discloses a sound that is transmitted to the user's auditory nerve through a portion of the user's body (such as the cartilage of the outer ear) that is contacting a vibrating object.

In the telephone disclosed in PTL 1, a rectangular vibrating body, formed from a piezoelectric bimorph and a flexible substance, is attached to an outer surface of a housing via an elastic member. PTL 1 also discloses that when voltage is applied to the piezoelectric bimorph in the vibrating body, the piezoelectric material expands and contracts in the longitudinal direction, causing the vibrating body to undergo bending vibration. Air-conducted sound and bone-conducted sound are transmitted to the user when the user touches the vibrating body to the auricle. The applicant has also developed a mobile phone that, unlike the mobile phone disclosed in PTL 1, causes a panel, such as a display panel or protective panel disposed on a surface of the mobile phone, to undergo bending vibration due to a piezoelectric element, and that transmits sound using air-conducted sound generated by the bending vibration and vibration sound, which is a sound component due to vibration transmitted when the vibrating panel is pressed against a human ear.

CITATION LIST

Patent Literature

PTL 1: JP 2005-348193 A
The inventor has also been involved in development of a mobile phone that, unlike the mobile phone disclosed in PTL 1, transmits sound using air-conducted sound, which is generated by vibrating a panel such as a display panel or protective panel disposed on a surface of the mobile phone, and vibration sound, which is a sound component due to vibration transmitted when the vibrating panel is pressed against a human ear. In order to appropriately evaluate an electronic device that transmits some form of sound by vibration, such as a telephone like the one in PTL 1, the mobile phone developed by the inventor, or the like, the inventor then conceived of how it would be preferable to measure the degree of the sound pressure and the amount of vibration transmitted to a human body by vibration of the vibrating body with as close of an approximation to a human body as possible. The following two methods of measurement are general methods for measuring the amount of vibration.

The first method of measurement is to measure the amount of vibration as voltage by pressing the vibrating body targeted for measurement against an artificial mastoid, for bone conducted vibrator measurement, that mechanically simulates the mastoid process behind the ear. The second method of measurement is to measure the amount of vibration as voltage by pressing a vibration pickup, such as a piezoelectric acceleration pickup, against the vibrating body targeted for measurement.

The measured voltage obtained with the first method of measurement, however, is a voltage mechanically weighted for characteristics of a human body when the vibrating body is pressed against the mastoid process behind a human ear. This is not a voltage weighted for characteristics of vibration transmission when the vibrating body is pressed against a human ear. Furthermore, the measured voltage obtained with the second method of measurement measures the amount of vibration of the vibrating body directly from the vibrating object. Similarly, this is not a voltage weighted for characteristics of vibration transmission to a human ear. Therefore, the amount of vibration that an electronic device transmits to a human body cannot be accurately evaluated by measuring the amount of vibration of the vibrating body with the above methods of measurement. For these reasons, there is a desire for the development of a device that can measure the amount of vibration weighted for characteristics of vibration transmission to a human ear.

For an electronic device provided with a vibrating body, such as a piezoelectric receiver, that transmits some form of sound by vibration, such as a telephone like the one in PTL 1, a mobile phone, or the like, there is a demand in managing device specifications to evaluate the device by testing the characteristics of the vibrating body at the manufacturing stage. Evaluation and specification management of an electronic device provided with a vibrating body, however, has not been considered whatsoever.

To cause a panel to undergo bending vibration due to a piezoelectric element, it is assumed that one entire surface of the piezoelectric element will be attached to the panel by an adhering member, such as double-sided tape, adhesive, or the like. In this case, it is also assumed that a buffer member will be provided between the piezoelectric element and the panel. When the piezoelectric element is thus attached to the panel, the vibration performance of the panel changes upon a change in the adhesive state between the panel and the piezoelectric element or buffer member. For example, when the piezoelectric element is driven continuously for a long period of time, it is therefore envisioned that the adhesive state of the piezoelectric element will change, inhibiting the vibration performance that was supposed to be achieved. This vibration performance cannot be evaluated without listening to the vibration sound transmitted when pressing an ear against the panel, yet it is difficult for a person to listen to vibration sound continuously for several hours and evaluate slight changes.

In order to satisfy the above-described demand, the present invention is to provide a vibration pickup device and a vibration measurement device for measuring an amount of vibration weighted for characteristics of vibration transmission to a human ear, especially to the portions centering on the cartilage of the ear.

The present invention is also to provide a measurement system and a measurement method that allow for accurate evaluation and easy specification management of an electronic device including a vibrating body that transmits sound by vibration transmission.

The present invention is also to provide a measurement system and a measurement method that allow for easy and accurate evaluation of an electronic device that transmits sound to a user based on vibration of a vibrating body.

SUMMARY

A vibration pickup device according to an aspect of the present invention is a vibration pickup device for measuring an electronic device that transmits sound to a user via vibration transmission by pressing a vibrating body held in a housing against a human ear, the vibration pickup device including:

a plate-shaped vibration transmission member and a vibration pickup joined to a portion of the vibration transmission member, such that the vibration transmission member is mountable on a peripheral portion of an artificial external ear canal and includes a hole in communication with the artificial external ear canal, and the artificial external ear canal is formed in an ear model unit modeled after a human ear.

The hole in the vibration transmission member may have a diameter of 5 mm to 18 mm.

The vibration transmission member may be ring-shaped.

The vibration transmission member may have an external diameter 6 mm to 12 mm greater than the diameter of the hole.

The vibration pickup may be a piezoelectric acceleration pickup.

A vibration measurement device according to another aspect of the present invention is a vibration measurement device for measuring an electronic device that transmits sound to a user via vibration transmission by pressing a vibrating body held in a housing against a human ear, the vibration measurement device including:

an ear model unit modeled after a human ear, and the above vibration pickup device, such that in the vibration pickup device, the hole formed in the vibration transmission member is in communication with the artificial external ear canal, and the vibration transmission member is mounted on a peripheral portion of the artificial external ear canal formed in the ear model unit.

The ear model unit may include a mounting portion that detachably mounts the vibration pickup device in a predetermined positional relationship.

The mounting portion may include an insertion holder that insertably holds the vibration transmission member and a positioning portion that positions the vibration pickup with respect to the ear model unit.

A human head model may be further included, such that the ear model unit is an artificial ear forming part of the head model and is detachable from the head model.

The ear model unit may include an ear model and an artificial external ear canal unit joined to the ear model, and the artificial external ear canal may be formed in the artificial external ear canal unit.

The length of the artificial external ear canal to the hole formed in the vibration transmission member of the vibration pickup device may be from 8 mm to 30 mm.

The ear model unit may be formed from material conforming to IEC 60318-7.

The ear model unit may further include a microphone device that measures sound pressure of sound propagating through the artificial external ear canal.

The microphone device may include a microphone held in a tube member extending from an outer wall of the artificial external ear canal.

The microphone device may include a microphone disposed in a floating state with respect to an outer wall of the artificial external ear canal.

A measurement system according to yet another aspect of the present invention is a measurement system for measuring vibration of an electronic device that transmits sound to a user via vibration transmission by pressing a vibrating body held in a housing against a human ear, the measurement system including: a signal output unit configured to output a test signal that vibrates the vibrating body; a storage configured to store a first test signal corresponding to a predetermined test sound; a generation unit configured to generate a second test signal corresponding to a different test sound than the predetermined test sound; and a controller configured to store vibration of the vibrating body vibrated by the first test signal or the second test signal and to measure the stored vibration.

A measurement system according to yet another aspect of the present invention is a measurement system for evaluating an electronic device that transmits sound to a user via vibration transmission by pressing a vibrating body held in a housing against a human ear, the measurement system including:

a test signal output unit configured to output a test signal that vibrates the vibrating body;

a vibration detector configured to detect vibration of the vibrating body; and a measurement unit configured to analyze vibration of the vibrating body based on output of the vibration detector, such that the measurement unit vibrates the vibrating body by outputting the test signal from the test signal output unit repeatedly a designated number of iterations across a predetermined frequency range and analyzes variation in a frequency characteristic of the vibration based on output of the vibration detector during sequential repetition of the test signal.

According to the present invention, a vibration pickup device and a vibration measurement device for measuring an amount of vibration weighted for characteristics of vibration transmission to a human ear may be provided.

Furthermore, according to the present invention, accurate evaluation may be made and specification management is facilitated for an electronic device including a vibrating body that transmits sound by vibration transmission.

According to the present invention, a measurement system and a measurement method may be provided, that allow for easy and accurate evaluation of an electronic device that transmits sound to a user based on vibration of a vibrating body that is held in a housing and pressed against a human ear.

BRIEF DESCRIPTION OF THE DRAWINGS

The present invention will be further described below with reference to the accompanying drawings, wherein:

FIG. 2 is a plan view illustrating an example of an electronic device targeted for measurement;

DETAILED DESCRIPTION

The following describes embodiments of the present invention with reference to the drawings.

Embodiment 1

Figure 1:
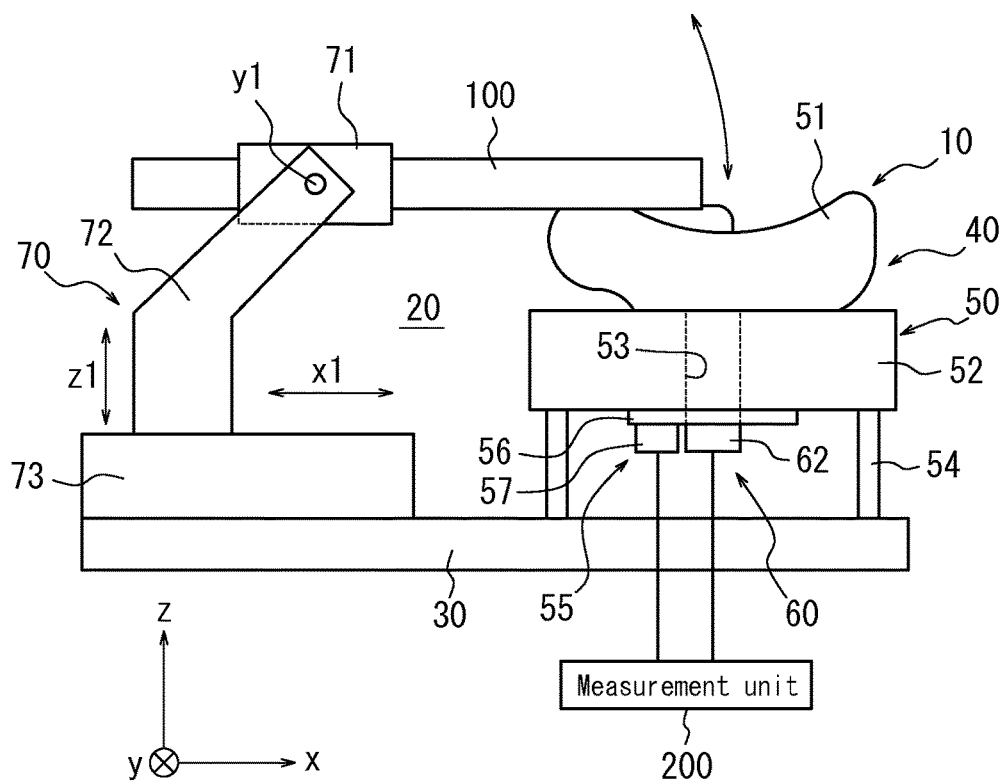
FIG. 1 schematically illustrates the structure of a measurement system that uses a vibration measurement device according to Embodiment 1 of the present invention.

FIG. 1 schematically illustrates the structure of a measurement system that uses a vibration measurement device according to Embodiment 1 of the present invention. A measurement system (measurement device) 10 according to the present embodiment is for evaluating an electronic device 100, which includes a vibrating body and is targeted for measurement. The measurement device 10 is provided with an electronic device mounting portion 20 and a measurement unit 200 connected to the electronic device mounting portion 20 and the electronic device 100. In the measurement device 10, the electronic device mounting portion 20 and the measurement unit 200 may be formed integrally, or the electronic device mounting portion 20 and the measurement unit 200 may be separate and appropriately connected. The electronic device mounting portion 20 is provided with a vibration measurement device (vibration measurement head) 40 supported by a base 30 and a holder 70 that holds the electronic device 100 targeted for measurement. The measurement unit 200 may be disposed on the base 30 or may be disposed separately from the base 30. In the explanation below, the electronic device 100 is assumed to be a mobile phone, such as a smartphone, that includes a rectangular panel 102 larger than a human ear on a surface of a rectangular housing 101, as illustrated in the plan view in FIG. 2, and that vibrates with the panel 102 as a vibrating body. First, the vibration measurement head 40 is described.

The vibration measurement head 40 is provided with an ear model unit 50 and a vibration pickup device (vibration detector) 55. The ear model unit 50 is modeled after a human ear and includes an ear model 51 and artificial external ear canal unit 52 joined to the ear model 51. The ear model unit 50 in FIG. 1 corresponds to the left ear of a human yet may be the left ear instead. An artificial external ear canal 53 is formed in the central region of the artificial external ear canal unit 52. The artificial external ear canal 53 is formed with a hole diameter of 5 mm to 10 mm, which is the average diameter of the human external acoustic pore. The ear model unit 50 is detachably supported on the base 30 via a support member 54 at the periphery of the artificial external ear canal unit 52. The artificial external ear canal unit 52 may be attached to the ear model unit 50 or may be produced integrally with the ear model unit 50 with a single mold.

The ear model unit 50 is made from similar material to the material of an average ear model used in, for example, a manikin such as a Head And Torso Simulator (HATS), Knowles Electronic Manikin for Acoustic Research (KEMAR), or the like, such as material conforming to IEC 60318-7. This material may, for example, be formed with a material such as rubber having a hardness of 35 to 55. The hardness of rubber may, for example, be measured in conformity with International Rubber Hardness Degrees (IRHD/M) conforming to JIS K 6253, ISO 48, or the like. As a hardness measurement device, a fully automatic IRHD/M micro-size international rubber hardness gauge GS680 by Teclock Corporation may suitably be used. Note that taking the variation in ear hardness due to age into account, as a rule of thumb, approximately two or three types of the ear model unit 50 with a different hardness are preferably prepared and used interchangeably.

The thickness of the artificial external ear canal unit 52, i.e. the length of the artificial external ear canal 53, corresponds to the length up to the human eardrum (cochlea) and for example is suitably set in a range of 5 mm to 50 mm, preferably 8 mm to 30 mm. In the present embodiment, the length of the artificial external ear canal 53 is approximately 30 mm.

Figure 3A:
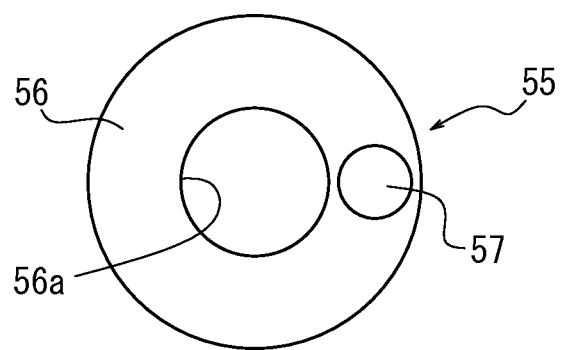
FIGS. 3A and 3B illustrate the structure of the vibration pickup device in FIG. 1.
Figure 3B:
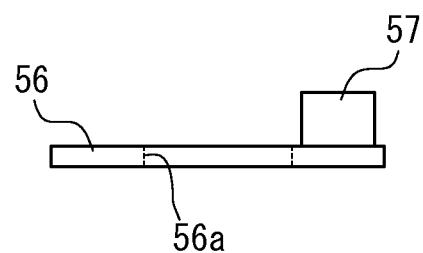

The vibration pickup device 55 detects the amount of vibration transmitted through the external ear canal unit 52 when the vibrating panel 102 is placed against the ear model unit 50. In other words, the vibration pickup device 55 detects the amount of vibration corresponding to the bone conducted component that is heard without passing through the eardrum when the panel 102 is pressed against a human ear and vibration of the panel 102 directly vibrates the inner ear. As illustrated by the plan view in FIG. 3A and the front view in FIG. 3B, the vibration pickup device 55 includes a plate-shaped vibration transmission member 56 and one vibration pickup 57 joined to a portion of one face of the vibration transmission member 56. The vibration transmission member 56 includes a hole 56a with a diameter nearly equal to the hole diameter of the artificial external ear canal 53, such as a diameter of 7 mm, 7.5 mm, or 15 mm. In the present embodiment, the other face of the vibration transmission member 56 is adhered to the end face of the artificial external ear canal unit 52 at the opposite side from the ear model 51, so that the hole 56a is in communication with the artificial external ear canal 53. The vibration pickup 57 is, for example, joined to one face of the vibration transmission member 56 with grease or the like therebetween. The vibration pickup 57 is connected to the measurement unit 200. The vibration pickup device 55 is further described below.

Figure 4A:
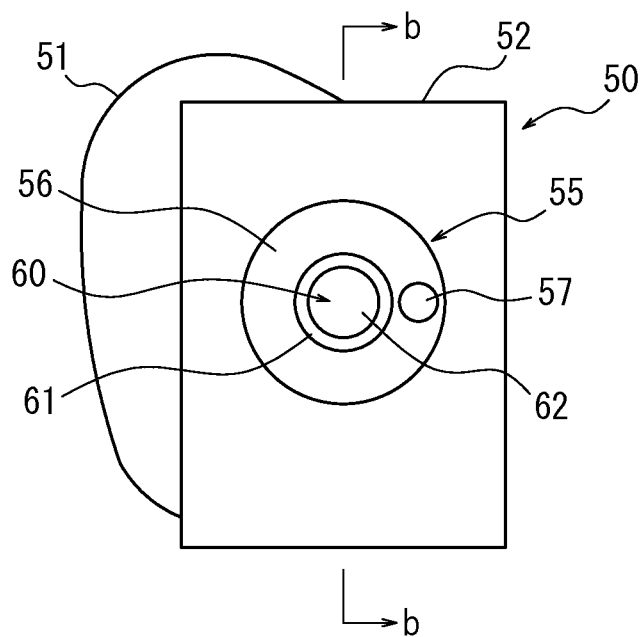
FIGS. 4A and 4B illustrate details on the vibration measurement head in FIG. 1.

Furthermore, the vibration measurement head 40 according to the present invention is provided with a microphone device (sound pressure measurement unit) 60 for measuring the sound pressure of sound propagating through the artificial external ear canal 53. As illustrated by the plan view in FIG. 4A from the side of the base 30 and the cross-sectional view in FIG. 4B along the b-b line in FIG. 4A, the microphone device 60 includes a tube member 61 and microphone 62 held by the tube member 61. The tube member 61 extends from the outer wall (peripheral wall of the hole) of the artificial external ear canal 53 through the hole 56a of the vibration transmission member 56 in the vibration pickup device 55. The microphone 62 is, for example, configured using a measurement capacitor microphone that has a low self-noise level and that has flat output characteristics in the measurement frequency range of the electronic device 100. As the microphone 62, for example the capacitor microphone UC-53A by Rion Corporation may be used. The microphone 62 is disposed so that the sound pressure detection face nearly matches the end face of the artificial external ear canal unit 52. The microphone 62 may, for example, be supported by the artificial external ear canal unit 52 or the base 30 and disposed in a floating state with respect to the outer wall of the artificial external ear canal 53. In FIG. 4A, the artificial external ear canal unit 52 is rectangular, yet the artificial external ear canal unit 52 may be any shape. The microphone 62 is connected to the measurement unit 200.

Next, the holder 70 is described. If the electronic device 100 is a mobile phone having a rectangular shape in plan view, such as a smartphone, then when a person holds a mobile phone in one hand and presses the mobile phone against his or her ear, both sides of the mobile phone are normally supported by the hand. The pressing force and contact position of the mobile phone against the ear differ for each person (user) and also vary during use. In the present embodiment, the electronic device 100 is held so as to simulate such a form of using the mobile phone.

Therefore, the holder 70 is provided with a support 71 that supports both sides of the electronic device 100. The support 71 is attached to one end of an arm 72 so as to be rotatable about an axis y1, which is parallel to the y-axis, in a direction to press the electronic device 100 against the ear model unit 50. The other end of the arm 72 is joined to a movement adjuster 73 provided on the base 30. The movement adjuster 73 can adjust movement of the arm 72 in a vertical direction x1 of the electronic device 100 supported by the support 71, the direction x1 being parallel to the x-axis that is orthogonal to the y-axis, and in a direction z1 that presses the electronic device 100 against the ear model unit 50, the direction z1 being parallel to the z-axis that is orthogonal to the y-axis and the x-axis.

In this way, the pressing force of the electronic device 100, which is supported by the support 71, against the ear model unit 50 of the vibrating body (panel 102) is adjusted by rotating the support 71 about the axis y1 or by moving the arm 72 in the z1 direction. In the present embodiment, the pressing force is adjusted in a range of 0 N to 10 N, preferably a range of 3 N to 8 N.

The reason for the range from 0 N to 10 N is to allow for measurement over a range that is sufficiently wider than the pressing force that is envisioned when a human presses the electronic device against an ear, for example to converse. The case of 0 N may, for example, include not only the case of contacting without pressing against the ear model unit 50, but also the case of holding the electronic device 100 at a distance from the ear model unit 50 in increments of 1 mm to 1 cm and measuring at each distance. This approach also allows for measurement with the microphone 62 of the damping of air-conducted sound due to distance, thus making the measurement device more convenient. The range of 3 N to 8 N is assumed to be the range of the average force with which a person with normal hearing presses an ordinary speaker against an ear to converse. Differences may exist by race or gender, yet what matters is that in an electronic device such as an ordinary mobile phone, a smartphone equipped with an ordinary speaker, or the like, it is preferable to able to measure the vibration sound and air-conducted sound for the pressing force that a user regularly applies.

By adjusting movement of the arm 72 in the x1 direction, the contact position of the electronic device 100 with respect to the ear model unit 50 can be adjusted so that, for example, the panel 102 that is an example of the vibrating body covers nearly the entire ear model unit 50, or so that the panel 102 covers a portion of the ear model unit 50, as illustrated in FIG. 1. A configuration may also be adopted to allow for adjustment of the electronic device 100 to a variety of contact positions with respect to the ear model unit 50 by making movement of the arm 72 adjustable in a direction parallel to the y-axis, or by making the arm 72 rotatable about an axis parallel to the x-axis or the z-axis. The vibrating body is of course not limited to an object like a panel that widely covers the ear, and for example an electronic device having a protrusion or corner that transmits vibration to only a portion of the ear model unit 50, such as the tragus, may be targeted for measurement in the present invention.

Figure 5:
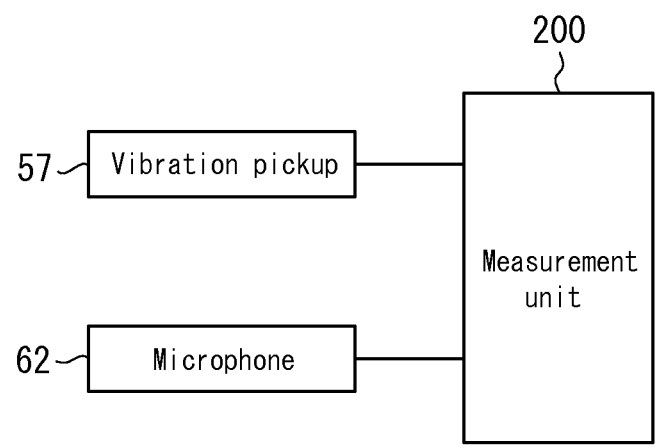
FIG. 5 is a functional block diagram of a section of the measurement system in FIG. 1.

FIG. 5 is a functional block diagram of a section of the measurement device 10 according to the present embodiment. The vibration pickup 57 and the microphone 62 are connected to the measurement unit 200, as described above. Based on output of the vibration pickup 57 and the microphone 62, the measurement unit 200 measures the amount of vibration, via the artificial external ear canal unit 52, and the sound pressure, via the artificial external ear canal 53, due to the electronic device 100. The measurement unit 200 also measures an auditory sensation based on the measured amount of vibration and sound pressure. These measurement results are output from an output unit such as a display, a printer, a storage, or the like and provided for evaluation of the electronic device 100.

Figure 6:
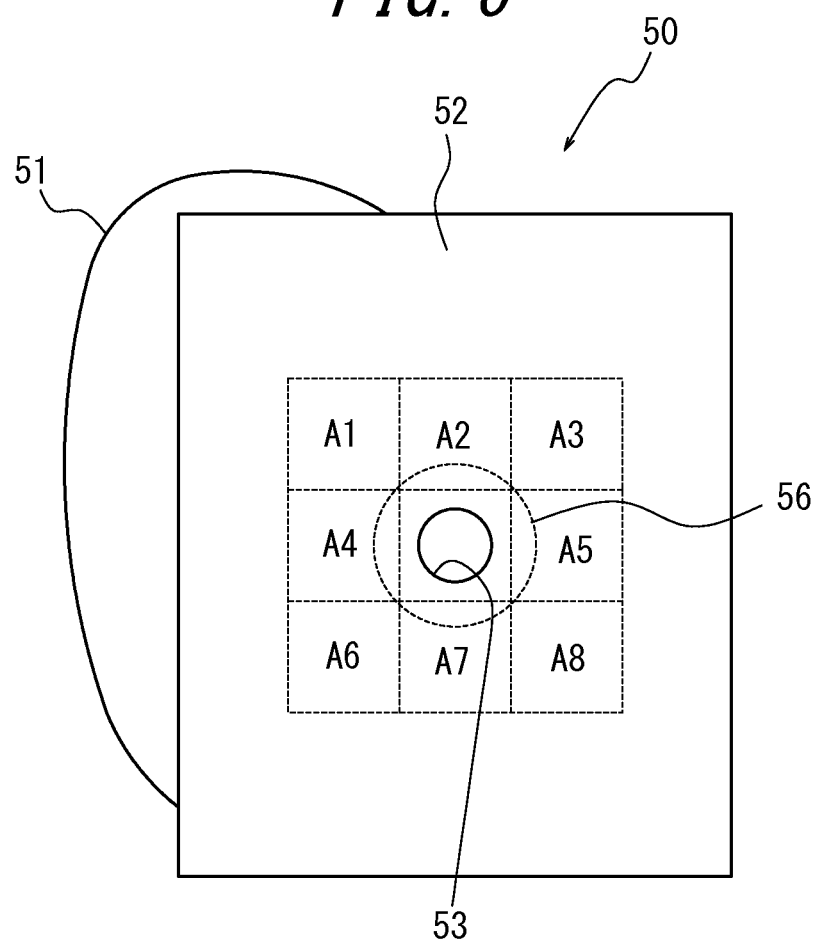
FIG. 6 illustrates the ear model unit in FIG. 1.

The vibration pickup device 55 is now described in greater detail. FIG. 6 is a plan view, from the base 30 side, of the ear model unit 50 in the vibration measurement head 40 of FIG. 1, with the vibration pickup device 55 removed. For the sake of convenience, FIG. 6 illustrates the area surrounding the hole in the artificial external ear canal 53 divided into eight areas A1 to A8. The ear model 51 in FIG. 1 is a model of a human left ear. In FIG. 6, area A4 mainly corresponds to the upper portion of the antitragus, and area A5 mainly corresponds to the tragus side.

Figure 7:
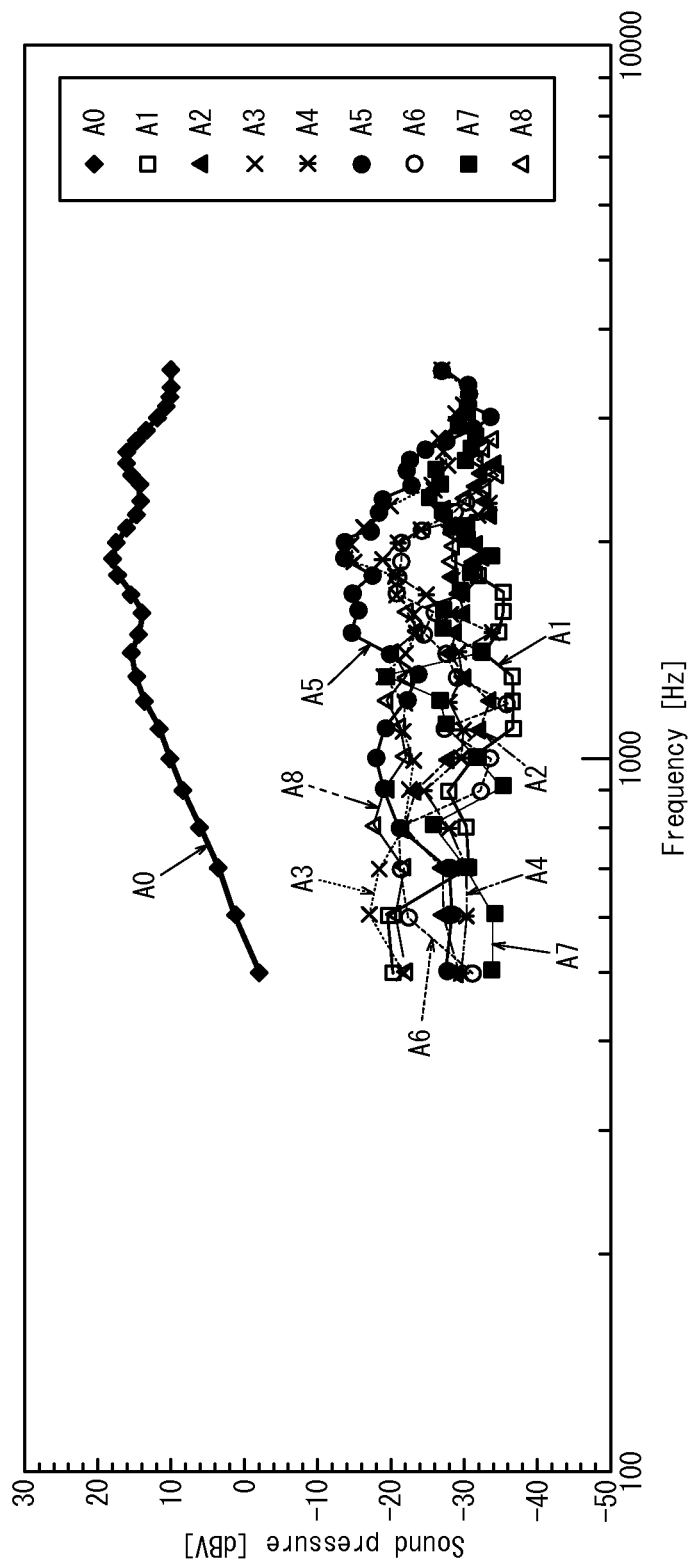
FIG. 7 illustrates an example of measurement results by the vibration pickup in a vibration experiment on the ear model unit in FIG. 6.
Figure 8:
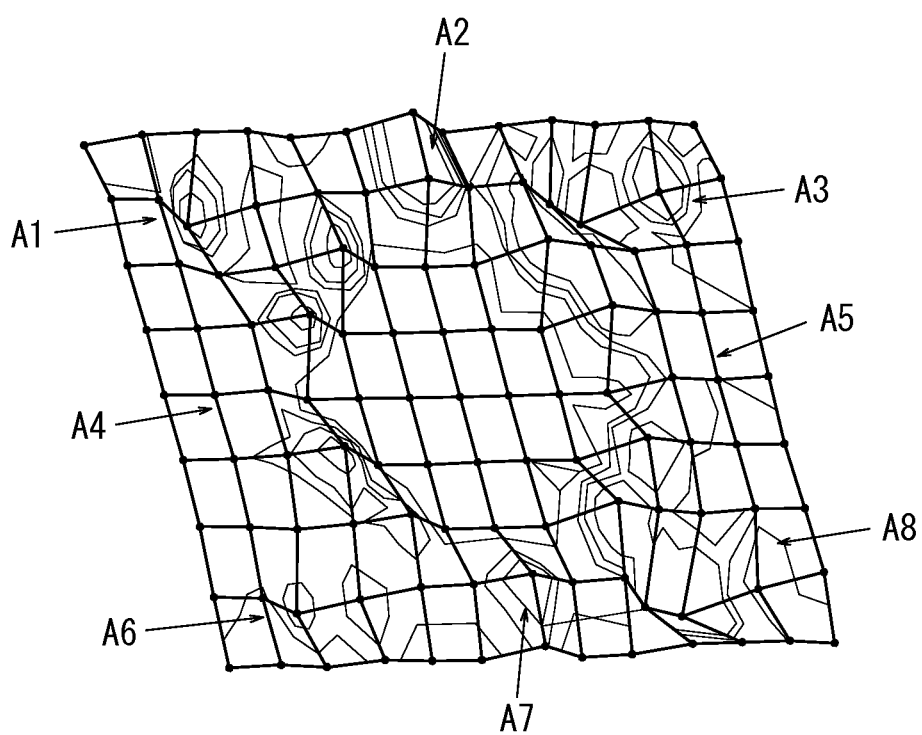
FIG. 8 illustrates an example of measurement results by a laser displacement gauge in a vibration experiment on the ear model unit in FIG. 6.

FIGS. 7 and 8 illustrate examples of measurement results for a vibration test on the ear model unit 50 in FIG. 6. The measurement results in FIG. 7 depict the amount of vibration for each of areas A1 to A8 in the ear model unit 50 in FIG. 6 when the ear model unit 50 was set on the base 30, the electronic device 100 was set in the holder 70, the panel 102 was pressed against the ear model unit 50, and in this state, the panel 102 was vibrated in a frequency range from 500 Hz to 3.5 kHz. The amount of vibration was measured by adhering one vibration pickup sequentially to the areas A1 to A8 via double-sided tape. In FIG. 7, A0 represents the result of measuring the amount of vibration of the panel 102 in the electronic device 100 with the same vibration pickup. The measurement results in FIG. 8 were obtained by using a laser displacement gauge to measure the form of vibration of the end face of the ear model unit 50 at the base 30 side upon vibrating the panel 102 of the electronic device 100 at a predetermined frequency (for example, 2000 Hz) under the same measurement conditions as FIG. 7.

As is clear from FIG. 7, the frequency characteristic of vibration detected for each of the areas A1 to A8 differs from the frequency characteristic A0 of vibration of the panel 102. Therefore, designating one area and adhering one vibration pickup decreases the detection accuracy of the vibration component transmitted to the auditory nerve. Adhering a vibration pickup to each of the plurality of areas in order to increase the detection accuracy, however, reduces the processing speed of the measurement device due to an increase in processing signals and also leads to a higher cost of the measurement device. Along with increased weight of the vibration pickups, there is also a risk of decreased detection accuracy of subtle vibration.

Furthermore, as is clear from FIG. 8, the amount of displacement of the ear model unit 50 due to vibration of the panel 102 in the electronic device 100 predominates in a line, along the tragus of the ear model 51, that includes areas A3, A5, and A8. Moreover, each of the areas A1 to A8 is not displaced uniformly, but rather the areas corresponding to the peripheral portion of the artificial external ear canal 53 are largely displaced.

In light of the above measurement results, the vibration pickup device 55 according to the present embodiment includes the plate-shaped vibration transmission member 56 and one vibration pickup 57 joined to a portion of one face of the vibration transmission member 56. The vibration transmission member 56 includes the hole 56*a* with a diameter equal to or greater than that of the artificial external ear canal 53. In the vibration pickup device 55, the face of the vibration transmission member 56 to which the vibration pickup 57 is not joined is attached, by adhering or the like, to the artificial external ear canal unit 52 around the artificial external ear canal 53, so that the hole 56*a* of the vibration transmission member 56 is in communication with the artificial external ear canal 53 without blocking the artificial external ear canal 53.

The vibration transmission member 56 is formed from material with good vibration transmission efficiency. For example, a metal or an alloy, such as steel, SUS, brass, aluminum or titanium, or plastic or the like may be used, yet in terms of detection sensitivity, a lightweight material is preferable. The vibration transmission member 56 may be rectangular, such as a square washer, yet in the present embodiment, a ring shape such as a round washer is adopted, since the amount of displacement of the ear model unit 50 is large at the peripheral portion of the artificial external ear canal 53, as illustrated in FIG. 8. The ring shape may, for example, have a diameter of approximately 20 mm to 70 mm, which is the diameter of approximately 10 mm to 30 mm of the hole 56*a* with the addition of twice the ring width of 5 mm to 20 mm. The thickness of the vibration transmission member 56 is set appropriately in accordance with material strength or the like. In greater detail, a 0.1 mm thick SUS plate with an outer diameter of 35 mm, a diameter of 25 mm for the hole 56*a*, and a width of 5 mm may be used.

Figure 4B:
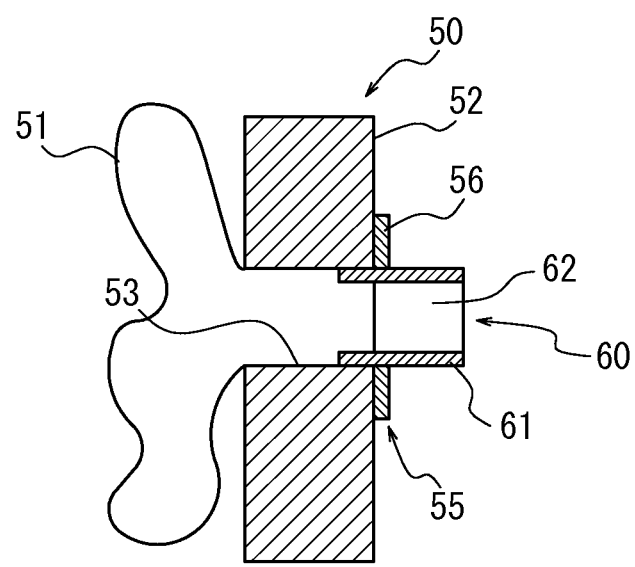

The vibration pickup 57 has flat output characteristics in the measurement frequency range (for example, 0.1 kHz to 30 kHz) of the electronic device 100, and an existing small vibration pickup that is lightweight and can accurately measure subtle vibration may be used. An example of such a vibration pickup is a piezoelectric acceleration pickup, such as the vibration pickup PV-08A by Rion Corporation or the like. In the present embodiment, a piezoelectric acceleration pickup is used as the vibration pickup 57, and the piezoelectric acceleration pickup is joined to the vibration transmission member 56 via a joining member, such as grease or the like, an instant adhesive such as Aron Alpha (registered trademark), or the like. As illustrated in FIGS. 7 and 8, the vibration of the panel 102 in the electronic device 100 is easily transmitted to areas A3, A5, and A8 of the ear model unit 50. Accordingly, the vibration pickup device 55 is preferably mounted on the artificial external ear canal unit 52 so that the vibration pickup 57 is opposite one of the areas A3, A5, and A8, for example area A5, or so as to straddle both areas A5 and A8, with the vibration transmission member 56 therebetween. FIGS. 4A and 4B illustrates an example of the vibration pickup device 55 being mounted so that the vibration pickup 57 is opposite area A5.

The measurement device 10 according to the present embodiment allows for the vibration that propagates to the peripheral portion of the artificial external ear canal 53 to be transmitted by the vibration pickup device 55 via the vibration transmission member 56 to one vibration pickup 57 and detected. In this way, the vibration pickup device 55 can be reduced in weight, and vibration over a large area in the peripheral portion of the artificial external ear canal 53 can be detected. Accordingly, a detection signal with good S/N can be obtained at a high level from the vibration pickup 57, thus allowing for highly accurate detection of the vibration component transmitted to the auditory nerve.

Moreover, the measurement device 10 according to the present embodiment can measure the vibration level weighted for characteristics of vibration transmission to a human ear, hence allowing for accurate evaluation of the electronic device 100. At the same time as the vibration level, the sound pressure can also be measured via the artificial external ear canal 53, allowing for measurement of an auditory sensation level that combines the vibration level, which corresponds to the amount of vibration transmission to the human ear, and the sound pressure level, which corresponds to the air-conducted sound. Hence, the electronic device 100 can be evaluated in greater detail. Furthermore, the pressing force on the ear model unit 50 of the electronic device 100 can be adjusted, as can the contact position, thus allowing for a variety of forms of evaluating the electronic device 100.

Embodiment 2

Figure 9A:
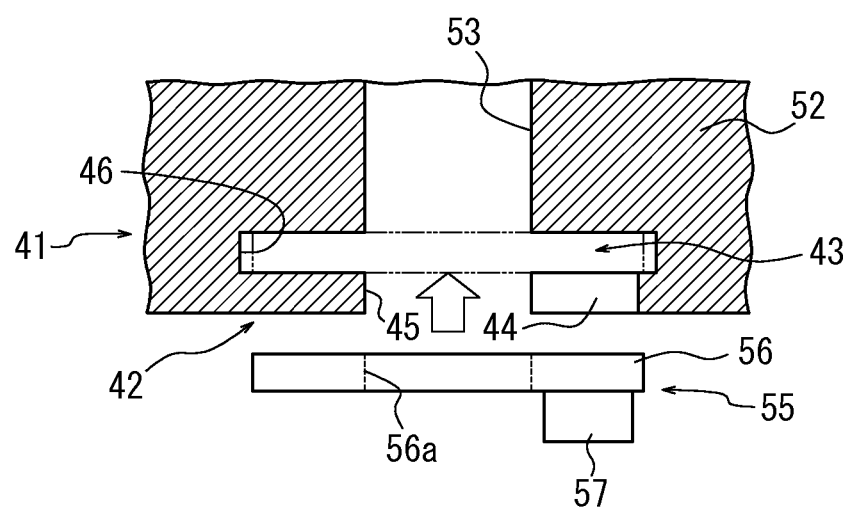
FIGS. 9A and 9B illustrate the structure of a section of a vibration measurement head according to Embodiment 2 of the present invention.
Figure 9B:
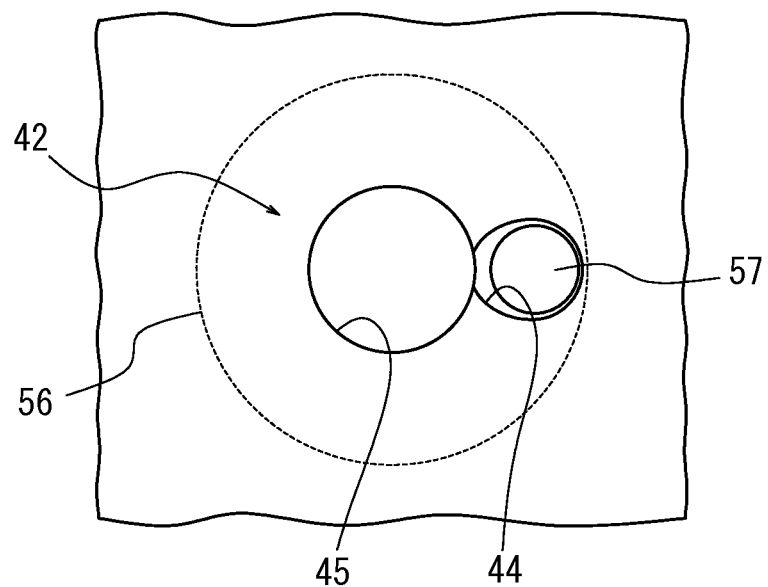

FIGS. 9A and 9B illustrate the structure of a section of a vibration measurement head according to Embodiment 2 of the present invention. FIG. 9A is a partial cross-section of the artificial external ear canal unit 52 before mounting of the vibration pickup device 55, and FIG. 9B is a bottom view of the artificial external ear canal unit 52 after mounting of the vibration pickup device 55. A vibration measurement head 41 according to the present embodiment has the structure of the vibration measurement head 40 according to Embodiment 1, with the inclusion of a mounting portion 42, at the end of the artificial external ear canal unit 52 opposite the ear model 51 (at the bottom side), for removably mounting the vibration pickup device 55 in a predetermined positional relationship. The mounting portion 42 includes an insertion holder 43 for the vibration transmission member 56 and a positioning portion 44 for the vibration pickup 57. The insertion holder 43 includes an opening 45, concentric and continuous with the artificial external ear canal 53, and a large-diameter space 46 in communication with the opening 45. The positioning portion 44 is formed by cutting the insertion holder 43 so that the vibration pickup 57 protrudes from a predetermined area of the insertion holder 43, for example an area corresponding to area A5 in FIG. 6. The cutout for the positioning portion 44 may be in communication with the opening 45 as well.

With the vibration measurement head 41 according to the present embodiment, when mounting the vibration pickup device 55 onto the mounting portion 42 of the ear model unit 50, the vibration transmission member 56 is inserted into the insertion holder 43 while widening the artificial external ear canal unit 52 at the bottom side of the insertion holder 43 to an extent not causing plastic deformation, so that the vibration transmission member 56 is held in the large-diameter space 46, with the vibration pickup 57 protruding from the positioning portion 44. In this way, in the vibration pickup device 55, the hole 56a of the vibration transmission member 56 is in nearly concentric communication with the artificial external ear canal 53 and the opening 45, and the vibration transmission member 56 is held by being embedded in the large-diameter space 46 in a predetermined positional relationship with respect to the ear model unit 50. Furthermore, the vibration pickup device 55 can be removed from the mounting portion 42 of the ear model unit 50 by expanding the artificial external ear canal unit 52 at the bottom side of the insertion holder 43 to an extent not causing plastic deformation and pulling the vibration transmission member 56 out from the insertion holder 43. Replacement of the ear model unit 50 or the vibration pickup device 55 is thus facilitated. The other effects are similar to those of Embodiment 1.

Embodiment 3

Figure 10:
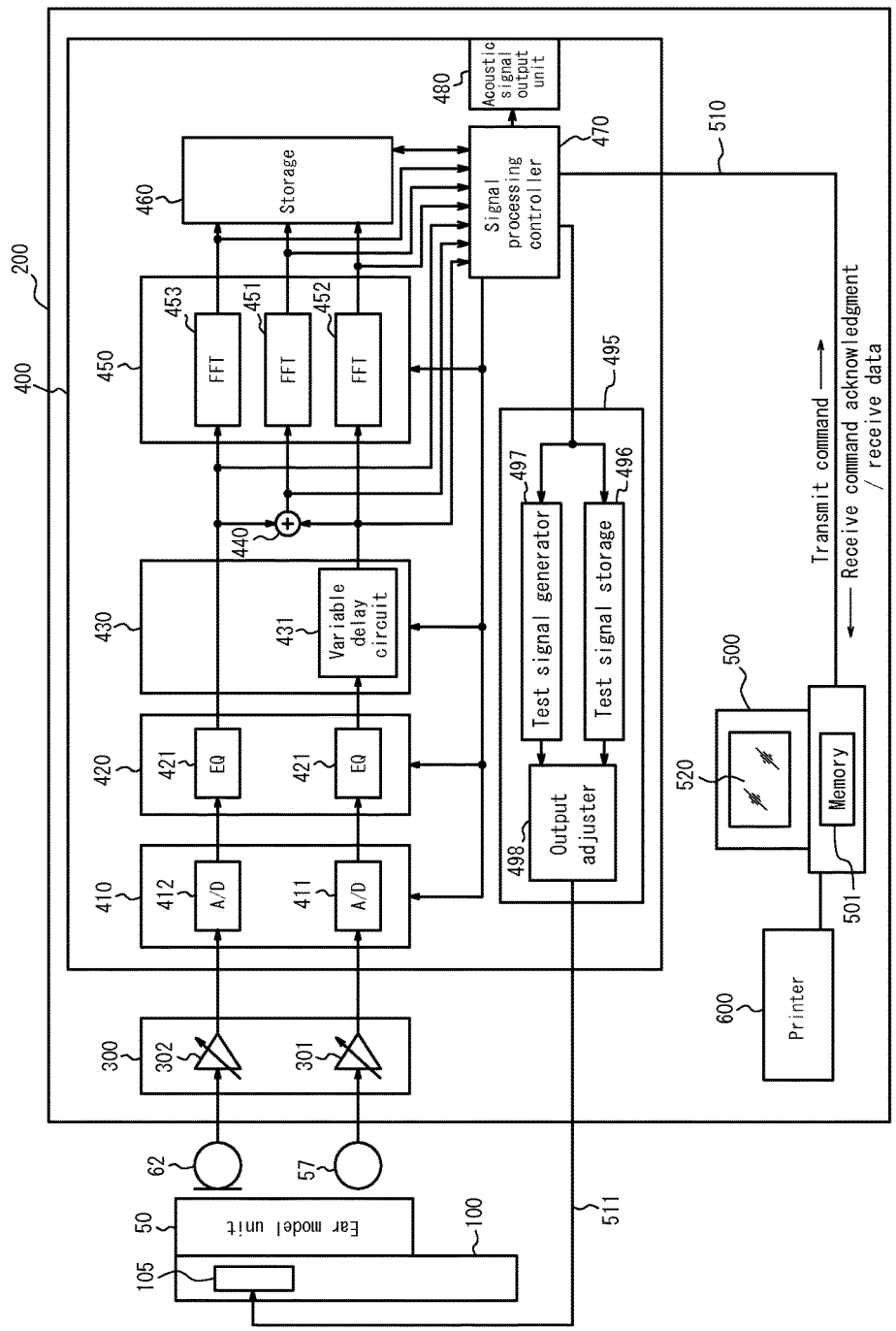
FIG. 10 is a functional block diagram of a section of a measurement system according to Embodiment 3 of the present invention.

Next, a measurement system according to Embodiment 3 of the present invention is described. The measurement system according to Embodiment 3 adopts a different structure for the measurement unit 200 within the structure of the measurement device 10 according to Embodiment 1. FIG. 10 is a functional block diagram illustrating the structure of a section of the measurement unit 200 in the measurement system (measurement device) according to Embodiment 3. The measurement unit 200 includes a sensitivity adjuster 300, signal processor 400, personal computer (PC) 500, and printer 600.

Output of the vibration pickup 57 and the microphone 62 is provided to the sensitivity adjuster 300. The sensitivity adjuster 300 includes a variable gain amplifier circuit 301 that adjusts the amplitude of the output of the vibration pickup 57 and a variable gain amplifier circuit 302 that adjusts the amplitude of the output of the microphone 62. The variable gain amplifier circuits 301 and 302 independently adjust the amplitude of analog input signals, corresponding to the respective circuits, to a required amplitude either manually or automatically. Error in the sensitivity of the vibration pickup 57 and the sensitivity of the microphone 62 is thus corrected. Note that the variable gain amplifier circuits 301 and 302 are configured to allow for adjustment of the amplitude of the input signals over a range of, for example, ±50 dB. Output of the sensitivity adjuster 300 is provided to the signal processor 400.

The signal processor 400 includes an A/D converter 410, frequency characteristic adjuster 420, phase adjuster 430, output combiner 440, frequency analyzer 450, storage 460, acoustic signal output unit 480, and signal processing controller 470. The A/D converter 410 includes an A/D conversion circuit (A/D) 411 that converts the output of the variable gain amplifier circuit 301 into a digital signal and an A/D conversion circuit (A/D) 412 that converts the output of the variable gain amplifier circuit 302 into a digital signal. The A/D conversion circuits 411 and 412 are, for example, 16 bits or more and can support 96 dB or more by dynamic range conversion. The A/D conversion circuits 411 and 412 may also be configured so that the dynamic range is changeable. Output of the A/D converter 410 is provided to the frequency characteristic adjuster 420.

The frequency characteristic adjuster 420 includes an equalizer (EQ) 421 that adjusts the frequency characteristic of the detection signal from the vibration pickup 57, i.e. the output of the A/D conversion circuit 411, and an equalizer (EQ) 422 that adjusts the frequency characteristic of the detection signal from the microphone 62, i.e. the output of the A/D conversion circuit 412. The equalizers 421 and 422 independently adjust the frequency characteristic of the respective input signals to a frequency characteristic near the auditory sensation of the human body either manually or automatically. The equalizers 421 and 422 may, for example, be configured with a graphical equalizer having a plurality of bands, a low pass filter, a high pass filter, or the like. Output of the frequency characteristic adjuster 420 is provided to the phase adjuster 430.

The phase adjuster 430 includes a variable delay circuit 431 that adjusts the phase of the detection signal from the vibration pickup 57, i.e. the output of the equalizer 421. Since the speed of sound transmitted through the material of the ear model unit 50 is not exactly the same as the speed of sound transmitted through human muscle or bone, it is assumed that the phase relationship between the output of the vibration pickup 57 and the output of the microphone 62 will be shifted greatly from that of a human ear, particularly at high frequencies. If the phase relationship between the output of the vibration pickup 57 and the output of the microphone 62 thus shifts greatly, then when combining the two outputs with the below-described output combiner 440, amplitude peaks and dips may appear at different times than in actuality, and the combined output may be amplified or diminished. Therefore, in accordance with the measurement frequency range of the electronic device 100 targeted for measurement, the phase of the detection signal from the vibration pickup 57, which is the output of the equalizer 421, is made adjustable over a predetermined range by the variable delay circuit 431.

For example, in the case of the measurement frequency range of the electronic device 100 being from 100 Hz to 10 kHz, the phase of the detection signal from the vibration pickup 57 is adjusted by the variable delay circuit 431 over a range of approximately ±10 ms (corresponding to ±100 Hz) at least in increments smaller than 0.1 ms (corresponding to 10 kHz), such as increments of 0.04 µs. In the case of a human ear as well, a phase shift occurs between bone-conducted sound (vibration transmission component) and air-conducted sound (air-conducted component). Therefore, phase adjustment by the variable delay circuit 431 is not for matching the phase of the detection signals from the vibration pickup 57 and the microphone 62, but rather for matching the phase of these detection signals to the actual auditory sensation by the ear. Output of the phase adjuster 430 is provided to the output combiner 440.

The output combiner 440 combines the detection signal from the vibration pickup 57, after phase adjustment by the variable delay circuit 431, with the detection signal, from the microphone 62, that has passed through the phase adjuster 430. It is thus enabled to approximate the human body in obtaining sensory sound pressure that combines the amount of vibration and the sound pressure, i.e. the vibration transmission component and air-conducted component, transmitted by vibration of the electronic device 100 targeted for measurement. The combined output of the output combiner 440 is provided to the frequency analyzer 450. The combined output of the output combiner 33 is also provided to the signal processing controller 470, along with the output of the vibration pickup 57, for which phase was adjusted, and the output of the microphone 62. Operations by the signal processing controller 470 are described below.

The frequency analyzer 450 includes a Fast Fourier Transform (FFT) 451 that performs frequency analysis on the combined output of the output combiner 440. In this way, power spectrum data corresponding to the sensory sound pressure, in which the vibration transmission component and the air-conducted component are combined, are obtained from the FFT 451.

Furthermore, the frequency analyzer 450 is provided with FFTs 452 and 453 that perform frequency analysis on the signals before combination by the output combiner 440, i.e. on the detection signal, from the vibration pickup 57, that has passed through the phase adjuster 430 and the detection signal from the microphone 62. In this way, power spectrum data corresponding to the vibration transmission component are obtained from the FFT 452, and power spectrum data corresponding to the air-conducted component are obtained from the FFT 453.

In the FFTs 451 to 453, analysis points are set for the frequency component (power spectrum) in correspondence with the measurement frequency range of the electronic device 100. For example, when the measurement frequency range of the electronic device 100 is 100 Hz to 10 kHz, analysis points are set so as to analyze the frequency component at each point when dividing the interval in a logarithmic graph of the measurement frequency range into 100 to 2000 equal portions.

The output of the FFTs 451 to 453 is stored in the storage 460. The storage 460 has the capacity of at least a double buffer that can store a plurality of analysis data sets (power spectrum data) for each of the FFTs 451 to 453. The storage 460 is configured to always allow for transmission of the latest data upon a data transmission request from the below-described PC 500. A configuration may be adopted for output of the FFTs 451 to 453 to be input to the signal processing controller 470. Operations by the signal processing controller 470 for this case are described below. A double buffer configuration need not be adopted if the analysis is not performed in real time but rather after recording.

The acoustic signal output unit 480 is configured so that an externally connected device, such as headphones, can be connected detachably. Via the signal processing controller 470, the detection signal from the vibration pickup 57 or the detection signal from the microphone 62 input into the output combiner 440, or the combination by the output combiner 440 of these detection signals, is selected and provided to the acoustic signal output unit 480. After appropriately adjusting the frequency characteristic of the input data with an equalizer or the like, the acoustic signal output unit 480 performs D/A conversion to an analog acoustic signal and outputs the result.

Furthermore, the signal processor 400 includes a test signal output unit 495. Based on control by the signal processing controller 470, the test signal output unit 495 vibrates the panel 102 of the electronic device 100 and outputs a test signal for evaluating the electronic device 100. The test signal output unit 495 includes a test signal storage 496, a test signal generator 497, and an output adjuster 498. The test signal output unit 495 corresponds to the "signal output unit" in the present embodiment.

The test signal storage 496 stores a test signal corresponding to a predetermined test sound. The predetermined test signal is, for example, a WAV file (audio data). The test signal storage 496 is preferably configured to selectively read a plurality of WAV files. Each WAV file stored in the test signal storage 496 is, for example, copied from a recording medium or downloaded over a network and stored. The test signal storage 496 corresponds to the "storage" in the present embodiment.

The test signal generator 497 generates a test signal corresponding to a different test sound than the test sound corresponding to the test signal stored in the test signal storage 496. The test signal generator 497 is preferably configured to allow for selective generation and output of a signal corresponding to a pure tone composed of a single frequency sine wave (pure tone signal), a signal corresponding to a pure tone sweep in which the frequency sequentially changes across a predetermined frequency range from low frequency to high frequency or high frequency to low frequency (pure tone sweep signal), and a signal that is composed of a plurality of sine wave signals of different frequencies and that corresponds to sound in which a plurality of pure tones are superimposed (multi-sine wave signal). The predetermined frequency range of the pure tone sweep signal may be appropriately set over a wide range that includes audible frequencies. The amplitude at the sequential frequencies in the pure tone sweep signal is preferably the same. The amplitude of each sine wave in the multi-sine wave signal is also preferably the same. The test signal generator 497 corresponds to the "generation unit" in the present embodiment.

Figure 11:
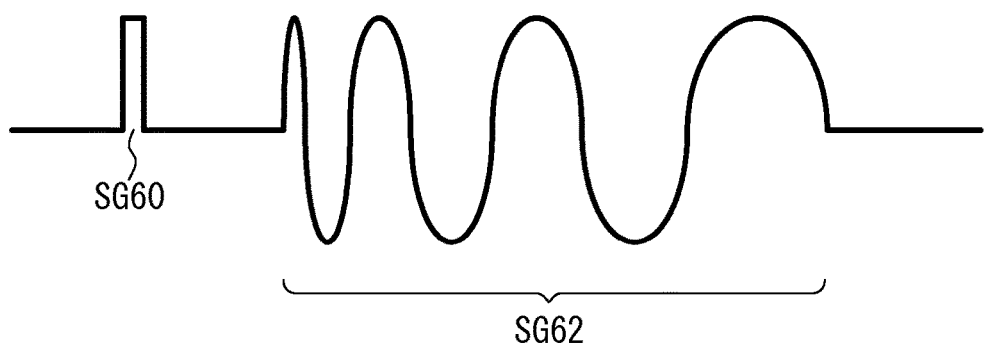
FIG. 11 illustrates an example of a cue signal and a test signal.

The output adjuster 498 adds a signal corresponding to a cue sound (cue signal) for the start of the test sound to each of the test signals output by the test signal generator 497 and the test signal storage 496 and outputs the result. FIG. 11 illustrates an example of a cue signal and a test signal. In FIG. 11, the horizontal axis is the time axis, and a cue signal SG60 followed by a test signal SG62 are illustrated. The cue signal SG60 is a signal that can be detected in the time domain. The cue signal SG60 is, for example, one or a plurality of sound signals of a predetermined sound pressure. Each signal included in the cue signal SG60 may be a pure tone of a predetermined frequency or may be sound composed of a plurality of pure tones with different frequencies. The frequency of the sounds may be the same or different. The interval between the cue signal SG60 and the test signal SG62 and the duration of each of these signals may be set freely.

In accordance with the signal format of external input to the electronic device 100 targeted for measurement, the output adjuster 498 converts the test signal to which the cue signal has been added to a predetermined signal format, such as conversion to an analog signal. In the case of the electronic device 100 being a mobile phone, the test signal output unit 495 may output a signal encoded in accordance with standards such as 3GPP (3GPP TS26.131/132), VoLTE, or the like. The test signal output unit 495 provides the encoded signal to an external input terminal 105 of the electronic device 100 via a connection cable 511 for an interface such as USB. In the electronic device 100, the signal provided to the external input terminal 105 is decoded and provided to a piezoelectric element attached to the panel 102. The piezoelectric element is driven, and the panel 102 vibrates.

Figure 12:
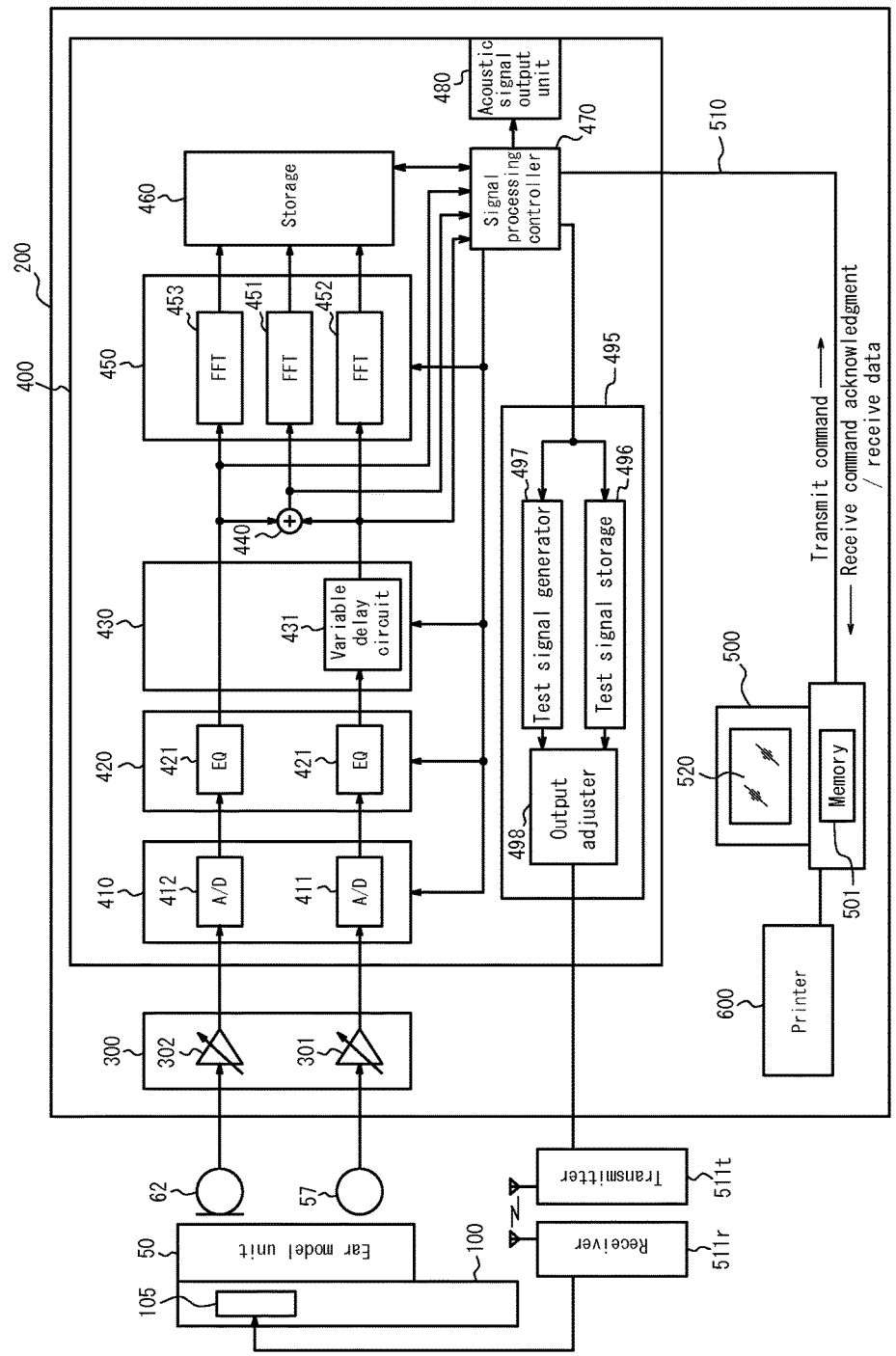
FIG. 12 is a modification to the functional block diagram of a section of the measurement system.

Alternatively, as illustrated in FIG. 12, instead of the connection cable 511, the measurement unit 200 may be configured so that a transmitter 511t encodes the cue signal and test signal output by the test signal output unit 495 and wirelessly transmits the result, and so that a receiver 511r receives and decodes the transmission signal from the transmitter 511t, providing the result to the external input terminal 105 of the electronic device 100. The configuration in FIG. 12 other than the transmitter 511t and the receiver 511r is the same as in FIG. 5. With this configuration, when the electronic device 100 is a mobile phone such as a smartphone, data loss via wireless communication can be simulated, thus allowing for more accurate measurement.

The signal processing controller 470 is connected to the PC 500 via a connection cable 510 for an interface such as USB, RS-232C, SCSI, PC card, or the like. Based on commands from the PC 500, the signal processing controller 470 controls operations of each portion of the signal processor 400. The sensitivity adjuster 300 and the signal processor 400 may be configured as software executed on any suitable processor, such as a central processing unit (CPU), or may be configured with a digital signal processor (DSP).

The PC 500 includes a memory 501 or the like that stores an evaluation application, a variety of data, and the like for the measurement system (measurement device) 10 to evaluate the electronic device 100. The memory 501 may be internal memory or external memory. The evaluation application is placed in the memory 501 by copying from a CD-ROM, downloading over a network, or the like. The PC 500 for example displays an application screen on a display 520 based on the evaluation application. Based on information input via the application screen, the PC 500 transmits a command to the signal processor 400. The PC 500 also receives a command acknowledgment and data from the signal processor 400, and based on the received data, executes predetermined processing and displays the measurement results on the application screen. As necessary, the PC 500 also outputs the measurement results to the printer 600 to print the measurement results.

The measurement system (measurement device) 10 has an aging test function, a problem reproduction function, and the like as the evaluation application for the electronic device 100. The aging test function performs a process of providing a pure tone sweep test signal and measuring the response, repeating this process continuously over a designated number of iterations and analyzing the variation in the frequency characteristic measured during the process. The problem reproduction function uses a cross-correlation function to identify the similarity between two signals, one for a provided sound (test sound) and one for a measured sound, to detect the occurrence of a problem such as a clip sound or a temporary sound cutoff, a disconnected sound due to wireless communication, encoding/decoding conversion of an unintended sound, or the like.

Figure 13:
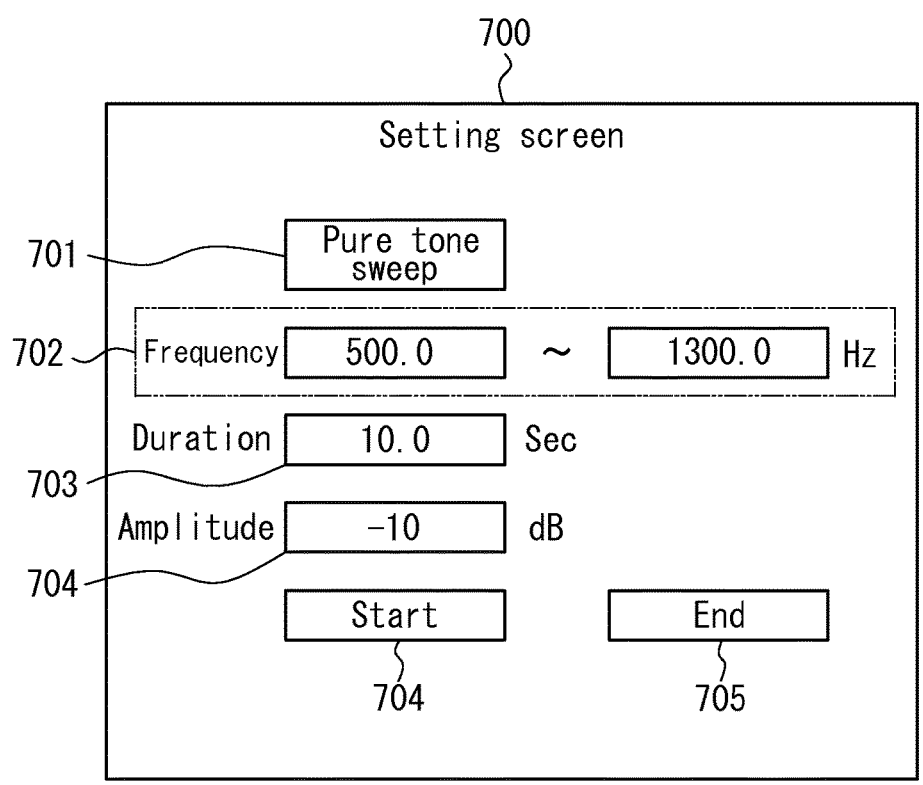
FIG. 13 illustrates an example of an evaluation application screen.

FIG. 13 illustrates an example of an evaluation application screen displayed on the display 520. Here, for example, a setting screen 700 for setting the test sound in the aging test function is illustrated. The setting screen 700 is activated from a menu in the evaluation application of the measurement device 10. The setting screen 700 includes a test sound setting unit 701, test sound frequency setting unit 702, test sound duration setting unit 703, test sound amplitude setting unit 704, measurement start icon 704, and measurement end icon 705. The test sound setting unit 701 displays a pull-down or pop-up list including, for example, a pure tone, pure tone sweep, multi-sine wave, and variety of WAV files to prompt for user selection. The case of a pure tone sweep being set as the test sound is illustrated. Any frequency between, for example, 100 Hz to 10 kHz is set in the test sound frequency setting unit 702. Here, a sweep width of 500 Hz to 1.3 KHz is set. Furthermore, the test sound duration is set to 10 s. The test sound amplitude is set to −10 dB.

Once setting of the test sound setting unit 701, test sound frequency setting unit 702, test sound duration setting unit 703, and test sound amplitude setting unit 704 is complete, and the measurement start icon 704 is operated, then the PC 500 transmits a test start command to the signal processor 400. Upon receiving the test start command, the signal processor 400 causes the test signal generator 497 to generate a test sound based on control by the signal processing controller 470. In the example in FIG. 13, a test signal corresponding to a pure tone sweep is generated. After the addition of a cue signal by the output adjuster 498, the generated test signal is provided via the connection cable 511 to the external input terminal 105 of the electronic device 100 that is targeted for measurement and held in the holder 70. In this way, the piezoelectric element attached to the back face of the panel 102 in the electronic device 100 is driven, the panel 102 vibrates, and vibration corresponding to the cue signal and the test signal is sequentially generated. Vibration measurement of the electronic device 100 then begins.

The signal processor 400 adjusts sensitivity of the output of the vibration pickup 57 and the microphone 62 with the sensitivity adjuster 300, then converts the results to digital signals with the A/D converter 410, adjusts the frequency characteristic with the frequency characteristic adjuster 420, and subsequently adjusts the phase with the phase adjuster 430 and combines the results with the output combiner 440. The output signal of the vibration pickup 57, the phase-adjusted output signal of the microphone 62, and the combined signal thereof are provided to the signal processing controller 470. On the other hand, the signal combined in the output combiner 440, i.e. the combined signal of the vibration transmission component and the air-conducted component, is subjected to frequency analysis by the FFT 451 of the frequency analyzer 450.

The signal processing controller 470 detects the cue signal based on the output signal of the vibration pickup 57, the phase-adjusted output signal of the microphone 62, and the combined signal thereof. For example, a pure tone signal of constant sound pressure that can be detected in the time domain is detected as the cue signal. In response to the detected cue signal, the signal processing controller 470 then stores the output of the FFT 451 in the storage 460. The signal processing controller 470 outputs the data stored in the storage 460 to the PC 500, and the PC 500 stores the data in the memory 501. When the preset duration of the test signal is complete, the signal processing controller 470 stops storing the output. The signal processing controller 470 corresponds to the "controller" in the present embodiment.

Alternatively, a configuration may be adopted so that when the cue signal is a signal detectable in the frequency domain, i.e. a signal at one or a plurality of predetermined frequencies, the signal processing controller 470 acquires the output of the FFT 451 and detects the cue signal having a predetermined frequency component. In response to detection of the cue signal, output of the FFT 451 is then stored in the storage 460.

The measurement unit 200 repeats the above processing until the measurement end icon 705 is operated. Alternatively, the setting screen 700 may be configured to allow for setting of the number of iterations, with the above processing being repeated until the set number of iterations is reached.

Figure 14:
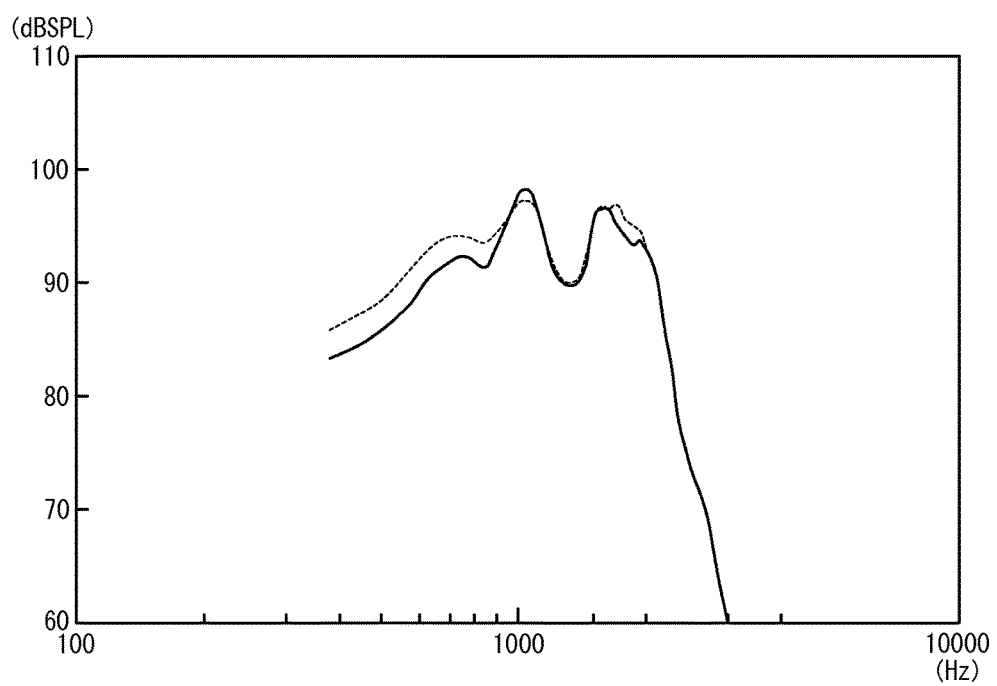
FIG. 14 illustrates an example of measurement results.

FIG. 14 illustrates an example of measurement results displayed on the display 520 by the evaluation application of the PC 500. The example in FIG. 14 illustrates a graph comparing frequency characteristics. The horizontal axis represents frequency (Hz) and the vertical axis represents sound pressure (dBSPL). The dashed line represents the frequency characteristic of the first iteration, and the solid line represents the frequency characteristic for the iteration that has the largest variation in overall sound pressure. The results of the aging test on the electronic device 100 are output from the printer 600 as necessary. The absolute value of the difference between the sound pressure level at the first iteration and the sound pressure level measured the $N^{th}$ iteration (N being one of the number of measurements starting at 1) at each frequency may be totaled, and the case of the largest total value among the N iterations may be treated as the above iteration with the largest variation in overall sound pressure when displaying, on the display 520, the graph representing the comparison between the first iteration and the iteration with the largest variation.

The measurement system according to the present embodiment vibrates the electronic device 100 with a desired test signal, uses the measurement unit 200 to measure the bone-conducted sound and air-conducted sound transmitted via the ear model unit 50 based on output of the vibration pickup device (vibration detector) 55 and the microphone device (sound pressure measurement unit) 60, and can evaluate the electronic device 100 based on the measurement results. Moreover, at the same time as the vibration level, the sound pressure level can also be measured with the microphone device 60 via the artificial external ear canal 53 of the ear model unit 50. The auditory sensation level that combines the vibration level, which corresponds to the amount of vibration transmission to the human ear, and the sound pressure level, which corresponds to the air-conducted sound, can thus be measured, allowing for evaluation of the electronic device 100 in greater detail. Furthermore, the holder 70 can adjust the pressing force on the ear model unit 50 of the electronic device 100 and can adjust the contact position, thus allowing for a variety of forms of evaluating the electronic device 100. Accordingly, the electronic device 100 can be evaluated properly, facilitating specification management of the electronic device 100.

In the measurement system according to the present embodiment, a test sound such as a WAV file is stored in the test signal storage 496 as minimal sound source information, and a pure tone, pure tone sweep, multi-sine wave, and the like are generated by the test signal generator 497, thus economizing on memory resources.

Furthermore, when the electronic device 100 is a mobile phone such as a smartphone, then adopting a configuration to provide the test signal to the electronic device 100 via wireless communication allows for simulation of data loss via wireless communication, thereby allowing for more accurate measurement.

When performing wireless communication, however, a difference in time until the test sound is played back on the electronic device 100 targeted for measurement occurs as compared to loop-back in which the test signal is input into the electronic device 100 via the connection cable 511. This difference in time is due to processing such as encoding by the transmitter 511$t$ and detection and decoding by the receiver 511$r$. As a result, in the signal processing controller 470, it becomes difficult to store and measure the test signal in synchronization with the start of playback of the test signal and to start measuring. With respect to this point, in the present embodiment a cue signal is added before the test signal, and storage begins after detecting the cue signal. Therefore, it becomes easy to store and measure the test signal in synchronization with the start of playback of the test signal, the processing load on the signal processing controller 470 can be reduced, and the storage area of the storage 460 can be used effectively.

Embodiment 4

Figure 15:
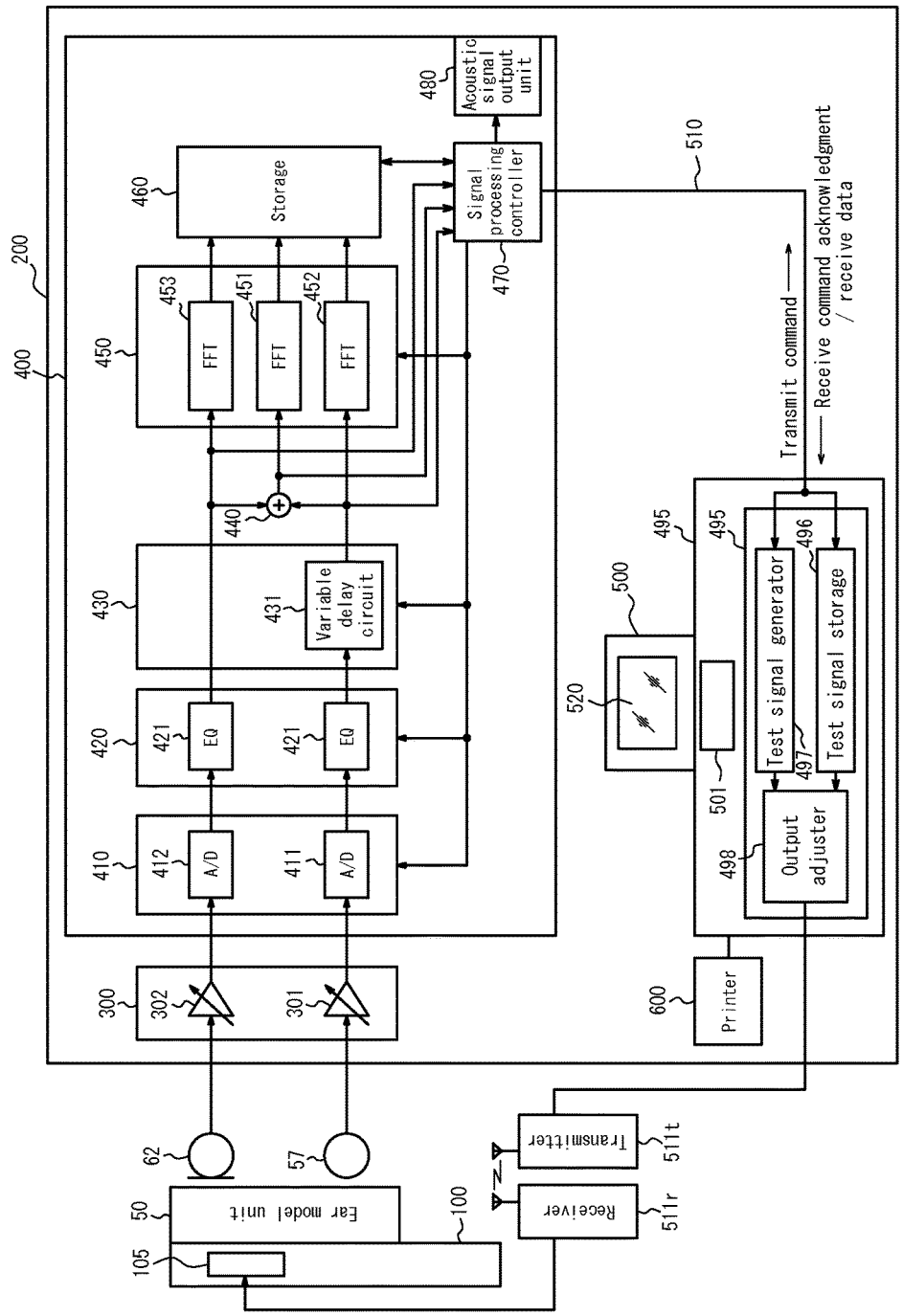
FIG. 15 is a functional block diagram of a section of a measurement system according to Embodiment 4 of the present invention.

FIG. 15 illustrates the structure of parts of a measurement system according to Embodiment 4 of the present invention. This measurement system 10 has the structure illustrated in FIG. 12, except that the PC 500, instead of the signal processor 400, includes the test signal output unit 495. Within the PC 500 in the structure in FIG. 15, once a test sound is set on the setting screen 700, the test signal output unit 495 responds by outputting the test signal stored in the test signal storage 496 or the test signal generated by the test signal generator 497. Other portions are the same as the structure in FIG. 12. Accordingly, similar effects as those of Embodiment 3 are obtained in the present embodiment as well, and since the PC 500 has the function of the test signal output unit 495, the configuration of the signal processor 400 can be simplified.

Embodiment 5

Like the measurement device (measurement system) 10 described in Embodiment 3 and Embodiment 4, the measurement device (measurement system) according to Embodiment 5 of the present invention has an aging test function and a problem reproduction function as the evaluation application for the electronic device 100. As described above, the aging test function performs a process of providing a pure tone sweep test signal and measuring the response, repeating this process continuously over a designated number of iterations and analyzing the variation in the frequency characteristic measured during the process.

The problem reproduction function stores, on the memory 501 of the PC 500, measurement data for a problem reproduced by providing a particular test signal, measuring the response, and comparing a cross-correlation coefficient between the test signal (provided sound) and the measured sound with a set cross-correlation coefficient threshold. In other words, a cross-correlation function is used to identify the similarity between two signals, one for a provided sound and one for a measured sound, and measured data that falls below the set correlation coefficient threshold is stored in the memory 501 of the PC 500 as data that reproduces a problem.

With reference to FIG. 10, the following describes the aging test function and the problem reproduction function with the measurement device according to the present embodiment in greater detail.

Aging Test Function

Figure 16:
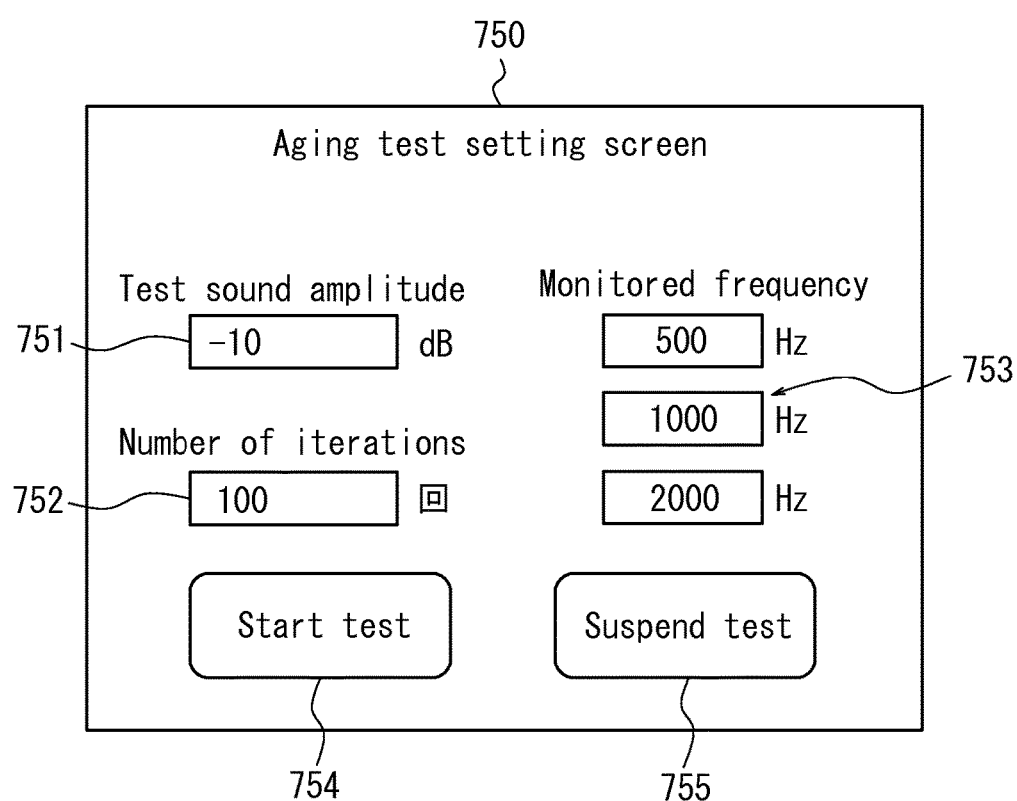
FIG. 16 illustrates an example of a setting screen for an aging test by a measurement system according to Embodiment 5 of the present invention.

In the aging test, the variation of the frequency characteristic overall and the variation at a designated, particular frequency are measured. FIG. 16 illustrates an example of an aging test setting screen displayed on the display 520 during the aging test. The aging test setting screen 750 is activated from a menu in the evaluation application of the measurement device 10. The aging test setting screen 750 includes a test sound amplitude setting unit 751, number of iterations setting unit 752, monitored frequency setting unit 753, test start icon 754, and test suspend icon 755. A pure tone sweep is set as the test sound (test signal).

The desired amplitude (dB) of the test sound is input into the test sound amplitude setting unit 751. A desired number of iterations, equal to or less than the maximum number of iterations (for example, 10,000) of the pure tone sweep, is input into the number of iterations setting unit 752. The monitored frequency setting unit 753 is provided for measuring the change in sound pressure in units of frequency. Any frequency between, for example, 100 Hz to 10 kHz is input into the monitored frequency setting unit 753. In FIG. 16, three monitored frequencies may be input.

The measurement device 10 begins the aging test once input into the test sound amplitude setting unit 751, number of iterations setting unit 752, and monitored frequency setting unit 753 is complete and the test start icon 754 is operated. The following describes an example of operations by the measurement device 10 for an aging test.

First, once the test start icon 754 on the aging test setting screen 750 in FIG. 16 is operated, the PC 500 transmits a test start command for the aging test to the signal processor 400. Upon receiving the test start command for the aging test, the signal processor 400 repeatedly generates a pure tone sweep with the test signal generator 497 of the test signal output unit 495, based on control by the signal processing controller 470. This generated pure tone sweep is provided via the output adjuster 498 and the connection cable 511 to the external input terminal 105 of the electronic device 100 that is targeted for measurement and held in the holder 70 (see FIG. 1). In this way, the piezoelectric element attached to the back face of the panel 102 in the electronic device 100 is driven, the panel 102 vibrates, and the aging test of the electronic device 100 begins.

Once the aging test begins, the signal processor 400 adjusts sensitivity of the output of the vibration pickup 57 and the microphone 62 with the sensitivity adjuster 300, then converts the results to digital signals with the A/D converter 410, adjusts the frequency characteristic with the frequency characteristic adjuster 420, and subsequently adjusts the phase with the phase adjuster 430 and combines the results with the output combiner 440. Subsequently, the signal processor 400 subjects the signal combined in the output combiner 440, i.e. the combined signal of the vibration transmission component and the air-conducted component, to frequency analysis with the FFT 451 of the frequency analyzer 450 and stores the result in the memory 501 the PC 500.

The measurement unit 200 executes the above processing for one pure tone sweep and then repeats the processing until reaching the set number of iterations of the pure tone sweep or until the test suspend icon 755 is operated. Once the set number of iterations is reached, or the test is suspended, the PC 500 displays a comparison graph, on the display 520, of the frequency characteristic during measurement for the first iteration and the frequency characteristic of the iteration with the largest variation in overall sound pressure, which indicates the total value of the sound pressure level at each frequency. The absolute value of the difference between the sound pressure level at the first iteration and the sound pressure level measured the $N^{th}$ iteration (N being one of the number of measurements starting at 1) at each frequency may be totaled, and the case of the largest total value among the N iterations may be treated as the above iteration with the largest variation in overall sound pressure when displaying, on the display 520, the graph representing the comparison between the first iteration and the iteration with the largest variation.

Figure 17:
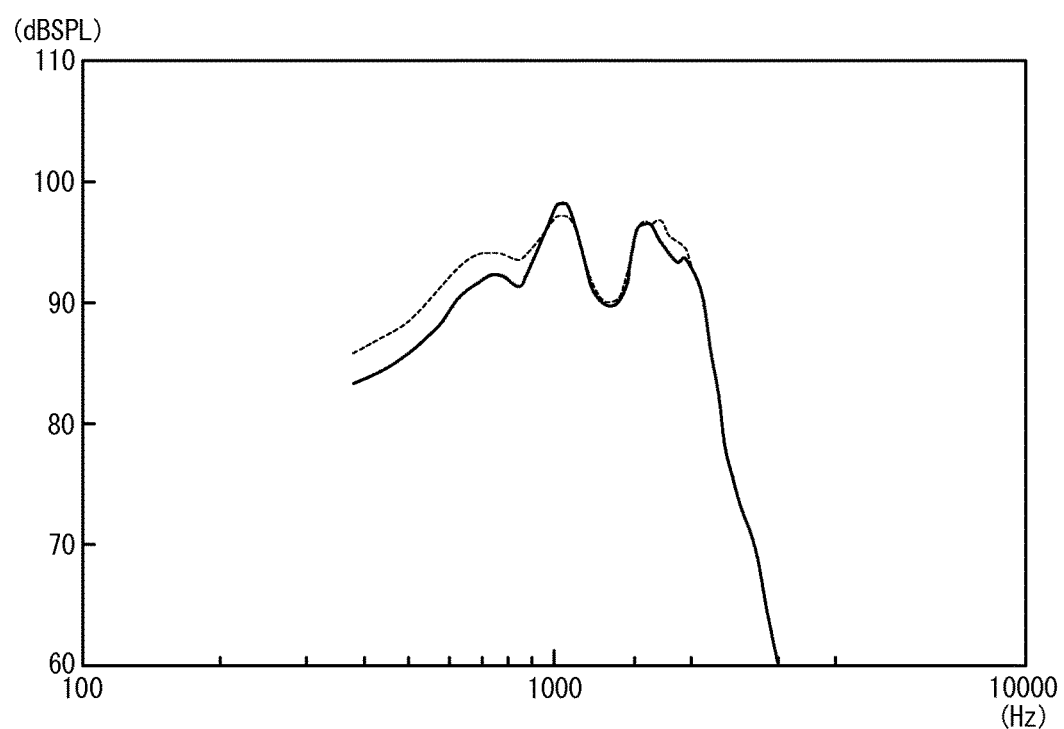
FIG. 17 illustrates an example of displaying the frequency characteristic resulting from the aging test.

FIG. 17 illustrates an example of a graph, displayed on the display 520, comparing frequency characteristics. In FIG. 17, the horizontal axis represents frequency (Hz) and the vertical axis represents sound pressure (dBSPL). The dashed line represents the frequency characteristic of the first iteration, and the solid line represents the frequency characteristic for the iteration that has the largest variation in overall sound pressure.

Figure 18:
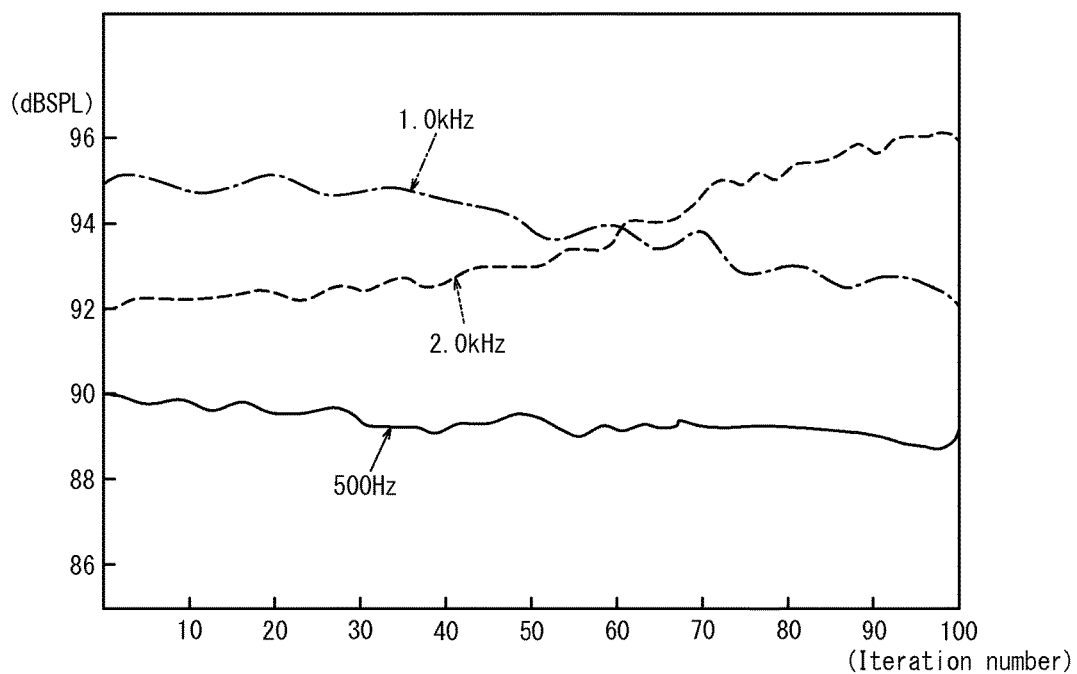
FIG. 18 illustrates an example of displaying the output variation, at monitored frequencies, resulting from the aging test.

In response to an input operation by the tester, the measurement unit 200 selectively displays, on the display 520, an output variation graph at the set monitored frequencies. FIG. 18 illustrates an example of an output variation graph, displayed on the display 520, at the monitored frequencies. In FIG. 18, the horizontal axis represents the number of iterations, and the vertical axis represents sound pressure (dBSPL). Note that the measurement results of the frequency closest to the set frequency among the sequential frequencies in the pure tone sweep are treated as the measurement results for each monitored frequency. The results of the aging test on the electronic device 100 are output from the printer 600 as necessary.

With the above aging test, subtle changes in sound when the piezoelectric element attached to the panel 102 of the electronic device 100 is continuously driven and a load is applied to the adhesive state can be evaluated.

Problem Reproduction Function

Figure 19:
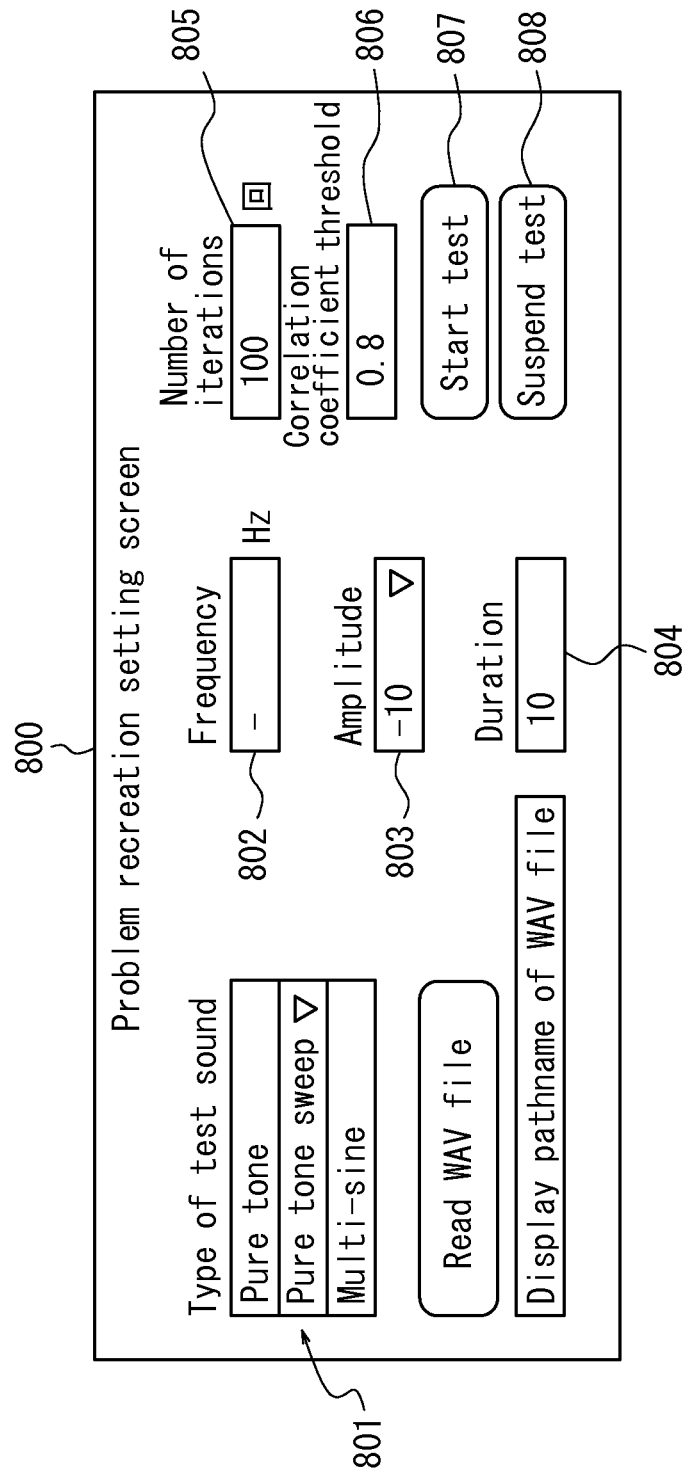
FIG. 19 illustrates an example of a setting screen of a test to reproduce a problem.

The test to reproduce a problem uses a cross-correlation function to identify the similarity between two signals, one for a provided sound (test sound) and one for a measured sound, in order to detect the occurrence of a problem such as a clip sound or a temporary sound cutoff, a disconnected sound due to wireless communication, encoding/decoding conversion of an unintended sound, or the like. FIG. 19 illustrates an example of a problem reproduction setting screen displayed on the display 520 during the test to reproduce a problem. Like the above-described aging test setting screen 750, the problem reproduction setting screen 800 is activated from a menu in the evaluation application of the measurement device 10.

The problem reproduction setting screen 800 includes a test sound type setting unit 801, frequency setting unit 802, test sound amplitude setting unit 803, test sound duration setting unit 804, number of iterations setting unit 805, correlation coefficient threshold setting unit 806, test start icon 807, and test suspend icon 808. The test sound type setting unit 801 selects and sets the test sound to be provided from among a pure tone/pure tone sweep/multi-sine/freely chosen WAV file. The WAV file is read from the test signal storage 496 of the test signal output unit 495 and output, and therefore the pathname that indicates the storage location of the WAV file in the test signal storage 496 is also displayed in the test sound type setting unit 801.

When a pure tone is set in the test sound type setting unit 801, the frequency thereof is input into the frequency setting unit 802. The desired amplitude (dB) of the test sound is input into the test sound amplitude setting unit 803. The playback duration of the test sound to be provided is input into the test sound duration setting unit 804. Since the cross-correlation of the test sound and a measured sound is calculated in the test for recreating a problem, a long measurement time is not appropriate. Accordingly, in the case of a WAV file, a duration of up to 10 s is preferable. A desired number of iterations until problem reproduction, equal to or less than the maximum number of iterations (for example, 10,000), is input into the number of iterations setting unit 805.

The threshold for the correlation coefficient between the test sound and the measured sound is input into the correlation coefficient threshold setting unit 806. The correlation coefficient varies within a normal range depending on the existence of wireless communication with the electronic device 100, the specifications of acoustic processing, and the like, and may be set to any value in, for example, a range of 0.0 to 1.0. The correlation coefficient may, for example, be set to any value in a range of 0.7 to 1.0 for a strong correlation, 0.4 to 0.7 for a moderate correlation, and 0.0 to 0.4 for nearly no correlation.

The measurement device 10 begins measurement to reproduce a problem once input into the test sound type setting unit 801, frequency setting unit 802, test sound amplitude setting unit 803, test sound duration setting unit 804, number of iterations setting unit 805, and correlation coefficient threshold setting unit 806 is complete and the test start icon 807 is operated. The following describes an example of operations by the measurement device 10 for a test to reproduce a problem.

First, once the test start icon 807 on the problem reproduction setting screen 800 in FIG. 19 is operated, the PC 500 transmits a test start command for the test to reproduce a problem to the signal processor 400. Upon receiving the test start command for the test to reproduce a problem, the signal processor 400 outputs the set test sound (test signal) from the test signal output unit 495 based on control by the signal processing controller 470. For example, when a WAV file is set in the test sound type setting unit 801, the signal processor 400 reads the set WAV file from the test signal storage 496 and outputs the WAV file via the output adjuster 498. When a pure tone, pure tone sweep, or multi-sine is set, the signal processor 400 generates the set test sound with the test signal generator 497 and outputs the result via the output adjuster 498. The test sound output from the test signal output unit 495 is provided to the PC 500 via the signal processing controller 470.

When using loopback, the test sound output from the measurement unit 200 is input into the external input terminal 105 of the electronic device 100 targeted for measurement via the connection cable 511, as illustrated in FIG. 10. By contrast, in the case of wireless communication, the test sound is input via the connection cable 511 into an external input terminal of the counterpart device communicating with the electronic device 100 targeted for measurement. Therefore, depending on whether wireless communication is performed, a difference occurs in the time until the provided test sound is played back by the electronic device 100 targeted for measurement.

As in the case of the aging test, the signal processor 400 combines the output of the vibration pickup 57 and the microphone 62 in the output combiner 440. Subsequently, the signal processor 400 subjects the signal combined in the output combiner 440, i.e. the combined signal of the vibration transmission component and the air-conducted component, to frequency analysis with the FFT 451 of the frequency analyzer 450 and provides the result to the PC 500. Based on the results of frequency analysis of the measured sound from the signal processor 400 and the results of frequency analysis of the provided sound (test sound) processed in the PC 500, the PC 500 computes a cross-correlation function between the combined waveform of the vibration transmission component and the air-conducted component and the waveform of the provided test sound to calculate the correlation coefficient and compares the calculated correlation coefficient with the set correlation coefficient threshold.

Figure 20A:
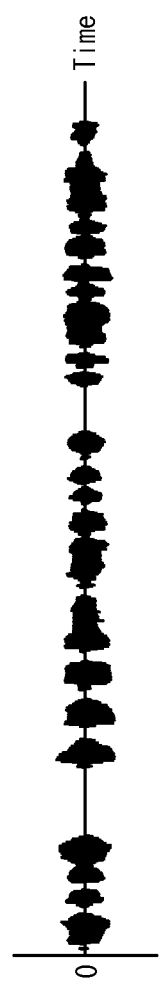
FIGS. 20A and 20B illustrates the time lag between the output of test sound and the start of playback in the test to reproduce a problem.
Figure 20B:
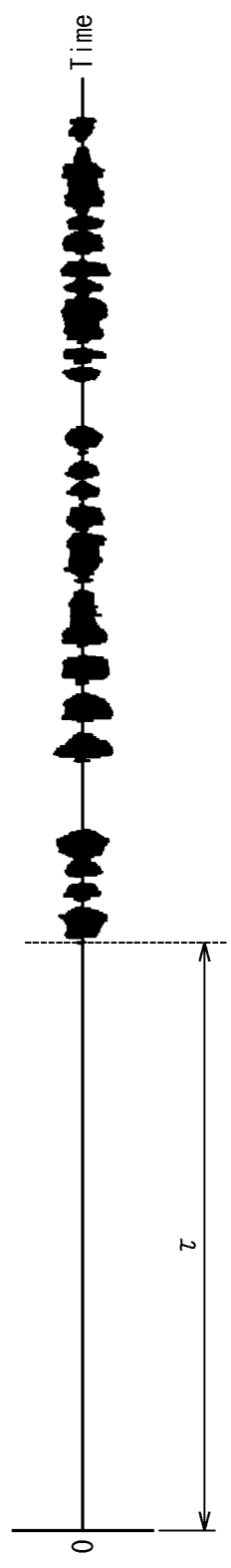

As illustrated in FIGS. 20A and 20B, a time difference τ exists between the timing of output of the test sound from the measurement unit 200 (FIG. 20A) and the timing of the start of playback of the test sound by the electronic device 100 targeted for measurement (FIG. 20B). Moreover, this time difference τ varies depending on the conditions of loopback, wireless communication, and the like. Therefore, the PC 500 calculates the correlation coefficient between the test sound and the measured sound starting at the time when the level of the input measured sound exceeds a noise level. A predetermined pilot signal may be inserted at the head of the measured sound, and the PC 500 may begin calculating the correlation coefficient in synchronization with detection of the pilot signal. In the PC 500, for example in the case of a WAV file, even if the analysis length when calculating the correlation coefficient is 10 seconds, the correlation coefficient is preferably calculated and compared with the threshold not for the entire 10 seconds, but rather by dividing into short time periods (such as 0.5 seconds). When the test sound is a pure sound sweep, the correlation is preferably calculated for the entire sweep waveform.

When the calculated correlation coefficient is equal to or greater than the set correlation coefficient threshold, the PC 500 determines that there is no problem and repeats the processing sequence from provision of the test sound through calculation of the correlation coefficient and comparison with the threshold, until the set number of iterations is reached. When the calculated correlation coefficient falls below the threshold before the number of iterations is reached, the PC 500 displays the message "problem reproduced" on the display 520 and stores the waveform data at that time (results of frequency analysis) in the memory 501 of the PC 500. The waveform data stored in the memory 501 is output from the printer 600 as necessary. When no problem occurs, i.e. when the calculated correlation coefficient is equal to or greater than the threshold, the waveform data is not stored.

Using the above problem reproduction function allows for detection of not only a clip sound of the electronic device 100 but also temporary sound cutoff by providing a variety of test sounds and calculating the correlation between the provided sound and the measured sound. Furthermore, by providing the test sound to the electronic device 100 from the counterpart device by wireless communication, the occurrence of a problem such as a disconnected sound due to wireless communication, encoding/decoding conversion of an unintended sound, or the like can also be detected, allowing for detection of a variety of problems related to sound.

Embodiment 6

Figure 21:
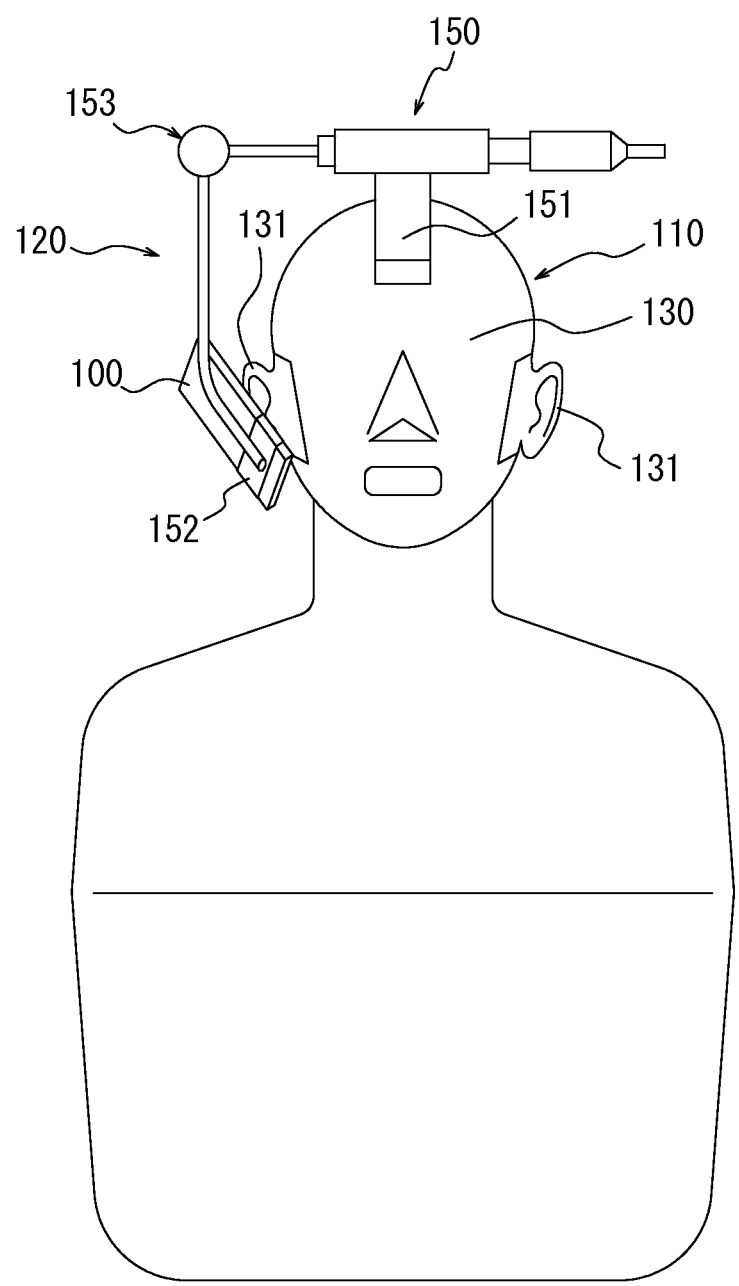
FIG. 21 schematically illustrates the structure of a measurement system according to Embodiment 6 of the present invention.

FIG. 21 schematically illustrates the structure of a measurement system according to Embodiment 6 of the present invention. A measurement device (measurement system) 110 according to the present embodiment has the same structure as the measurement device (measurement system) 10 of the above embodiments, as in FIG. 1, except that the structure of an electronic device mounting portion 120 differs from that of the electronic device mounting portion 20 illustrated in FIG. 1. Accordingly, the measurement unit 200 illustrated in FIG. 1 is omitted from FIG. 21. The electronic device mounting portion 120 is provided with a human head model 130 and a holder 150 that holds the electronic device 100 targeted for measurement. The head model 130 is, for example, HATS, KEMAR, or the like. Artificial ears 131 of the head model 130 are detachable from the head model 130.

Figure 22A:
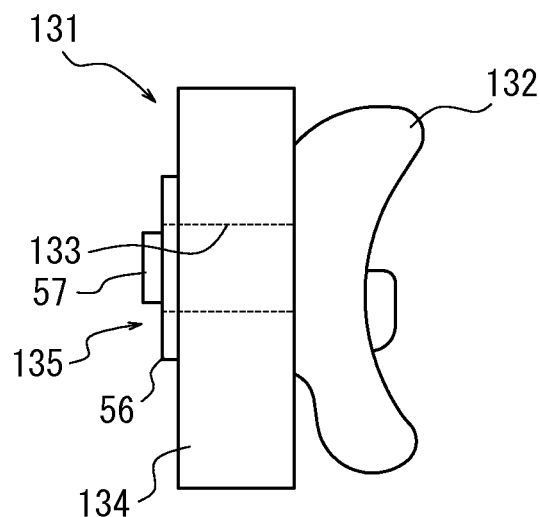
FIGS. 22A and 22B are detailed diagrams of the measurement system in FIG. 21.
Figure 22B:
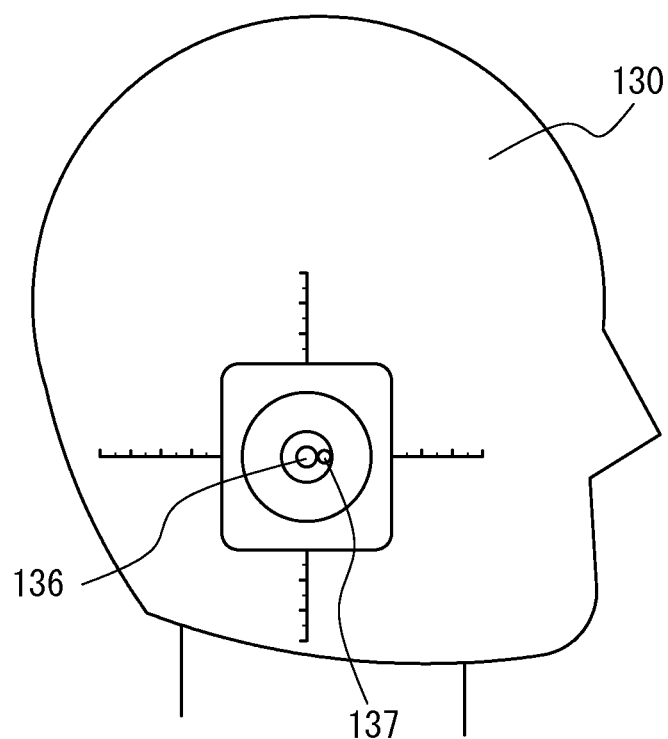

The artificial ear 131 forms the ear model unit and includes, like the ear model unit 50 in FIG. 1, an ear model 132 and an artificial external ear canal unit 134, joined to the ear model 132, in which an artificial external ear canal 133 is formed, as illustrated by the side view in FIG. 22A of the artificial ear 131 removed from the head model 130. In the artificial external ear canal unit 134, like the ear model unit 50 in FIG. 1, a vibration pickup device 135 provided with a vibration transmission member 56 and a vibration pickup 57 is disposed in the peripheral portion of the opening of the artificial external ear canal 133. Accordingly, in the present embodiment, the artificial ear 131 and the vibration pickup device 135 form the vibration measurement head. FIG. 22A illustrates the right artificial ear 131 as viewed from behind. As illustrated by the side view in FIG. 22B with the artificial ear 131 removed, a microphone device 136 provided with a microphone in the central portion thereof is disposed on the mounting portion of the artificial ear 131 in the head model 130, and an opening 137 into which the vibration pickup 57 of the vibration pickup device 135 fits is formed in the peripheral portion. The microphone device 136 is disposed so as to measure sound pressure of sound propagating through the artificial external ear canal 133 of the artificial ear 131 once the artificial ear 131 is mounted on the head model 130. Like the ear model unit 50 in Embodiment 1, the microphone device 136 may be disposed on the artificial ear 131 side. The vibration pickup forming the vibration pickup device 135 and the microphone forming the microphone device 136 are connected to a measurement unit, as in FIG. 1.

A holder 150 is attached to the head model 130 detachably and includes a head fixing portion 151 for fixing to the head model 130, a support 152 that supports the electronic device 100 targeted for measurement, and an articulated arm 153 connecting the head fixing portion 151 and the support 152. The holder 150 is configured so that, like the holder 70 in FIG. 1, the pressing force and contact position, on the artificial ear 131, of the electronic device 100 supported by the support 152 can be adjusted via the articulated arm 153.

The measurement device 110 according to the present embodiment achieves effects similar to those of the measurement device 10 in the above-described embodiments. Among other effects, in the present embodiment, the electronic device 100 is evaluated by detachably mounting a vibration measurement head that includes the artificial ear 131 for vibration detection and the vibration pickup device 135 to the human head model 130, thus allowing for evaluation that conforms more closely to the actual form of use by accounting for the effect of the head.

The present invention is not limited to the above embodiments, and a variety of modifications and changes are allowed. For example, in the above embodiments, a mobile phone such as a smartphone that vibrates with the panel 102 as the vibrating body is assumed to be the electronic device 100 targeted for measurement, yet an electronic device such as a clamshell phone in which a panel vibrates, the panel being contacted to an ear during a form of use such as talking on the phone, may be similarly evaluated. Evaluation is not limited to a mobile phone, and other piezoelectric receivers, hearing aids, and the like such as a BlueTooth (registered trademark) headset, speaker, or the like that transmits sound by vibration transmission may be similarly evaluated. In Embodiment 6, as in Embodiment 2, a mounting portion may be provided in the artificial ear 131 to detachably mount the vibration pickup device 55 in a predetermined positional relationship.

Furthermore, in the measurement unit 200 illustrated in FIG. 10, the test signal output unit 495 may be internal to the PC 500, and a test signal may be provided from the PC 500 to the electronic device 100 targeted for measurement and to the counterpart device for the electronic device 100. The vibration measurement head 40 of the electronic device mounting portion 20 and the holder 70 that holds the electronic device 100 are not limited to the above-described structures, and it suffices to adopt a structure that detachably holds the electronic device 100 and that at least allows for measurement of the vibration component of the vibrating body. When for example measuring direct vibration of the vibrating body, the ear model unit 50 and the microphone device 60 may be omitted depending on the characteristic being measured for the vibrating body. Furthermore, in accordance with the structure of the vibration measurement head 40, the FFTs 452 and 453 may be omitted, or the FFTs 451 and 453 may be omitted and the aging test and test to reproduce a problem performed based on the frequency characteristic of the vibration transmission component from the FFT 452.

In the above embodiments, the PC 500 is provided separately from the signal processor 400 in the measurement unit 200, yet the functions of the evaluation application executed by the PC 500 may be installed in the signal processor 400 and the PC 500 omitted. Furthermore, the measurement unit 200 is not limited to being stand-alone and to consolidating all of the functions. Rather, a configuration utilizing a network system or the cloud, such as the case of distributing the measurement unit 200 over one or a plurality of PCs or external servers, may of course be adopted.

REFERENCE SIGNS LIST

10: Measurement device (measurement system)
30: Base
40, 41: Vibration measurement head (vibration measurement device)
42: Mounting portion
43: Insertion holder
44: Positioning portion
45: Opening
46: Large-diameter space
50: Ear model unit
51: Ear model
52: Artificial external ear canal unit
53: Artificial external ear canal 54: Support member
55: Vibration pickup device (vibration detector)
56: Vibration transmission member
60: Microphone device (sound pressure measurement unit)
61: Tube member
62: Microphone
70: Holder
71: Support
72: Arm
73: Movement adjuster
75: Signal processor
76: Output unit
100: Electronic device
101: Body
102: Panel (vibrating body)
110: Measurement device (measurement system)
130: Head model
131: Artificial ear
132: Ear model
133: Artificial external ear canal
134: Artificial external ear canal unit
135: Vibration pickup device
136: Microphone device
150: Holder
151: Head fixing portion
152: Support
153: Articulated arm
400: Signal processor
410: A/D converter
420: Frequency characteristic adjuster
430: Phase adjuster
440: Output combiner
450: Frequency analyzer
460: Storage
470: Signal processing controller
480: Acoustic signal output unit
495: Test signal output unit
496: Test signal storage
497: Test signal generator
500: PC (personal computer)
501: Memory
510, 511: Connection cable

The invention claimed is:

1. A measurement system for measuring vibration of an electronic device that transmits sound to a user via vibration transmission by pressing a vibrating body held in a housing against a human ear, the measurement system comprising:
   an ear model unit having an ear model and an artificial ear canal connected to the ear model;
   a signal output unit configured to output a test signal that vibrates the vibrating body;
   a storage configured to store a first test signal corresponding to a predetermined test sound;
   a generation unit configured to generate a second test signal corresponding to a different test sound than the predetermined test sound; and
   a controller configured to store vibration generated at the ear model unit by the vibrating body vibrated by the first test signal or the second test signal and to measure the stored vibration.

2. The measurement system of claim 1, wherein the signal output unit adds a signal corresponding to a cue sound at a start of the test sound of each of the first test signal and the second test signal.

3. The measurement system of claim 2, wherein the controller starts storing vibration based on the test sound upon detecting the cue sound.

4. The measurement system of claim 1, further comprising:
   a transmitter configured to wirelessly transmit the first test signal and the second test signal; and
   a receiver configured to receive the first test signal and the second test signal transmitted wirelessly and to transmit the first test signal and the second test signal to the vibrating body.

5. The measurement system of claim 1, wherein
   the first test signal corresponds to a sound included in a WAV file, and
   the second test signal corresponds to a pure tone or a sound based on a pure tone.

6. A measurement method for measuring vibration of an electronic device that transmits sound to a user via vibration transmission by pressing a vibrating body held in a housing against a human ear, the measurement method including steps of:
   outputting a first test signal or a second test signal, the first test signal corresponding to a predetermined test sound and being read from a storage storing the first test signal, and the second test signal corresponding to a different test sound than the predetermined test sound and being generated by a generation unit;
   adding a signal corresponding to a cue sound at a start of the test sound of each of the first test signal and the second test signal;
   vibrating a vibrating body via the first test signal or the second test signal;
   starting to store in a storage upon detecting the cue sound, vibration generated, based on the test sound, at an ear model unit having an ear model and an artificial ear canal connected to the ear model, and
   measuring the stored vibration with a signal processing controller.

* * * * *